United States Patent
Awad et al.

(10) Patent No.: US 12,414,154 B2
(45) Date of Patent: Sep. 9, 2025

(54) TERMINALS, BASE STATIONS, SYSTEMS, METHODS, CIRCUITRY AND COMPUTER PROGRAM PRODUCTS

(71) Applicant: Sony Group Corporation, Tokyo (JP)

(72) Inventors: Yassin Aden Awad, Basingstoke (GB); Shin Horng Wong, Basingstoke (GB); Martin Warwick Beale, Basingstoke (GB); Naoki Kusashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 348 days.

(21) Appl. No.: 18/030,280

(22) PCT Filed: Oct. 7, 2021

(86) PCT No.: PCT/EP2021/077760
§ 371 (c)(1),
(2) Date: Apr. 5, 2023

(87) PCT Pub. No.: WO2022/078876
PCT Pub. Date: Apr. 21, 2022

(65) Prior Publication Data
US 2023/0371068 A1    Nov. 16, 2023

(30) Foreign Application Priority Data
Oct. 14, 2020   (EP) ..................................... 20201856

(51) Int. Cl.
*H04W 74/08*   (2024.01)
*H04W 72/0453*   (2023.01)
(Continued)

(52) U.S. Cl.
CPC .... *H04W 74/0808* (2013.01); *H04W 72/0453* (2013.01); *H04W 76/27* (2018.02)

(58) Field of Classification Search
CPC ............. H04W 74/0808; H04W 76/27; H04W 72/0445
See application file for complete search history.

(56) References Cited

U.S. PATENT DOCUMENTS

2019/0335456 A1*  10/2019  Yerramalli ........ H04W 74/0808

FOREIGN PATENT DOCUMENTS

WO    2017/196246 A2    11/2017

OTHER PUBLICATIONS

International Search Report and Written Opinion mailed on Jan. 27, 2022, received for PCT Application PCT/EP2021/077760, filed on Oct. 7, 2021, 9 pages.

(Continued)

*Primary Examiner* — Brenda H Pham
(74) *Attorney, Agent, or Firm* — XSENSUS LLP

(57) ABSTRACT

A method includes determining an operating mode of a first terminal of the one or more terminals; selecting, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and communicating between the first terminal and the base station and via the first frequency band, using contention-based access and based on the first frame configuration.

20 Claims, 10 Drawing Sheets

(51) Int. Cl.
*H04W 74/0808* (2024.01)
*H04W 76/27* (2018.01)

(56) References Cited

OTHER PUBLICATIONS

NTT Docomo, Inc., "Revised WID on New Radio Access Technology", 3GPP TSG RAN Meeting #78, RP-172834, Dec. 18-21, 2017, 11 pages.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.
Huawei et al., "New WID: Physical Layer Enhancements for NR Ultra-Reliable and Low Latency Communication (URLLC)", 3GPP TSG RAN Meeting #83, RP-190654, Mar. 18-21, 2019, 5 pages.
NTT Docomo, "New SID Proposal: Study on New Radio Access Technology", 3GPP TSG RAN Meeting #71, RP-160671, Mar. 7-10, 2016, 8 pages.
Nokia et al., "Revised WID: Enhanced Industrial Internet of Things (IoT) and ultra-reliable and low latency communication (URLLC) support for NR", 3GPP TSG RAN Meeting #88e, RP-201310, 6 pages.
Holma et al., "LTE for UMTS OFDMA and SC-FDMA Based Radio Access", John Wiley & Sons, 2009, pp. 25-27.
Moderator (Ericsson), "Summary#5 on enhancements for unlicensed band URLLC/IIoT for R17", 3GPP TSG RAN WG1 Meeting #102-e, R1-2007391, Aug. 17-28, 2020, 66 pages.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.
Qualcomm Inc., "Revised WID on NR-based Access to Unlicensed Spectrum", 3GPP TSG RAN Meeting #84, RP-191575, Jun. 3-6, 2019, 8 pages.
Nokia et al., "New WID on enhanced Industrial Internet of Things (IoT) and URLLC support", 3GPP TSG RAN Meeting #86, RP-193233, Dec. 9-12, 2019, 5 pages.
3GPP, "Study on Scenarios and Requirements for Next Generation Access Technologies; (Release 14)", 3GPP TR 38.913 V14.3.0, Jun. 2017, 39 pages.

* cited by examiner

TERMINALS, BASE STATIONS, SYSTEMS, METHODS, CIRCUITRY AND COMPUTER PROGRAM PRODUCTS

CROSS-REFERENCE TO RELATED APPLICATIONS

The present application is based on PCT filing PCT/EP2021/077760, filed Oct. 7, 2021, which claims the Paris Convention priority of European patent application EP20201856.0, filed 14 Oct. 2020, the contents of each are hereby incorporated by reference.

FIELD

The present disclosure relates to terminals, base stations, systems, methods, circuitry and computer program products.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems are able to support a wider range of services than simple voice and messaging services offered by earlier generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example, it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of a desire to support new types of devices with a variety of applications there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay.

The increasing use of different types of network infrastructure equipment and terminal devices associated with different traffic profiles give rise to new challenges for efficiently handling communications in wireless communications systems that need to be addressed.

Example use cases currently considered to be of interest for next and latest generation wireless communication systems include so-called Ultra Reliable and Low Latency Communications (URLLC)/enhanced Ultra Reliable and Low Latency Communications (eURLLC). See, for example, the 3GPP documents RP-160671, "New SID Proposal: Study on New Radio Access Technology," NTT DOCOMO, RAN #71 [1]; RP-172834, "Work Item on New Radio (NR) Access Technology," NTT DOCOMO, RAN #78 [2]; RP-182089, "New SID on Physical Layer Enhancements for NR Ultra-Reliable and Low Latency Communication (URLLC)," Huawei, HiSilicon, Nokia, Nokia Shanghai Bell, RAN #81 [3]; and RP-190654, "Physical layer enhancements for NR ultra-reliable and low latency communication (URLLC)," Huawei, HiSilicon, RAN #89, Shenzhen, China, 18 to 21 Mar. 2019 [4].

Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems, in particular to accommodate very different types of communication modes and services.

SUMMARY

The invention is defined in the independent claims. Further example embodiments are provided in the dependent claims.

According to a first aspect of the present disclosure, there is provided a method for communicating in a mobile telecommunications network, the network comprising at least a base station configured to provide a wireless interface for one or more terminals to communicate with the base station, wherein the wireless interface comprises a first frequency band in which access to resources in the frequency band is a contention-based access. The method comprises determining an operating mode of a first terminal of the one or more terminals; selecting, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and communicating between the first terminal and the base station and via the first frequency band, using contention-based access and based on the first frame configuration.

According to a second aspect of the present disclosure, the method of the first aspect may be implemented by the first terminal, by the base station and/or by a system comprising the base station and first terminal.

According to a third aspect of the present disclosure, there is provided a terminal for use in in a mobile telecommunications network, the network comprising at least a base station configured to provide a wireless interface for one or more terminals to communicate with the base station, the one or more terminals comprising the terminal wherein the wireless interface comprises a first frequency band in which access to resources in the frequency band is a contention-based access. The terminal is configured to determine an operating mode of the terminal; select, based on the operating mode, a first frame configuration from a plurality of frame configurations for the terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and send transmissions to the base station via the first frequency band, using contention-based access and based on the first frame configuration.

According to a fourth aspect of the present disclosure, there is provided a base station for communicating in a mobile telecommunications network, the network comprising at least the base station, the base station being configured to provide a wireless interface for one or more terminals to communicate with the base station, wherein the wireless interface comprises a first frequency band in which access to resources in the frequency band is a contention-based access. The base station is configured to determine an operating mode of a first terminal of the one or more terminals; select, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and receive transmissions from the first terminal via the first frequency band, based on contention-based access and based on the first frame configuration.

According to a fifth aspect of the present disclosure, there is provided a mobile telecommunications system comprising a base station according to the fourth aspect and a terminal according to the third aspect.

According to a sixth aspect of the present disclosure, there is provided circuitry for a terminal in a mobile telecommunications network, wherein the circuitry comprises a controller element and a transceiver element configured to operate together to connect to the mobile telecommunication network via a wireless interface provided by a base station. The controller element and the transceiver element are further configured to operate together to determine an operating mode of the terminal; select, based on the operating mode, a first frame configuration from a plurality of frame configurations for the terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and send transmissions to the base station via the first frequency band, using contention-based access and based on the first frame configuration.

According to a seventh aspect of the present disclosure, there is provided circuitry for a base station in a mobile telecommunications network, wherein the circuitry comprises a controller element and a transceiver element configured to operate together to provide a wireless interface to communicate with one or more terminals. The controller element and the transceiver element are further configured to operate together to determine an operating mode of a first terminal of the one or more terminals; select, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and receive transmissions from the first terminal via the first frequency band, based on contention-based access and based on the first frame configuration.

According to a eighth aspect of the present disclosure, there is provided a computer program product comprising instructions which, when the program is executed by a computer, cause the computer to carry out a method according to the first or second aspect.

It is to be understood that both the foregoing general description and the following detailed description are illustrative, but are not restrictive, of the present technology. The described example devices, systems or methods of the present disclosure, together with associated teachings, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

In the following description, reference is made to the accompanying drawings which illustrate several examples of the present disclosure. It is to be understood that other examples may be implemented and system or method changes may be made without departing from the teachings of the present disclosure. The following detailed description is not to be taken in a limiting sense, and the scope of the present invention is defined only by the claims. It is to be understood that drawings are not necessarily drawn to scale.

DESCRIPTION OF EXAMPLES

The invention is defined in the appended claims. The present disclosure includes example arrangements falling within the scope of the claims (and other arrangements may also be within the scope of the following claims) and may also include example arrangements that do not necessarily fall within the scope of the claims but which are then useful to understand the teachings and techniques provided herein.
Long Term Evolution Advanced Radio Access Technology (4G)

Figure 1:
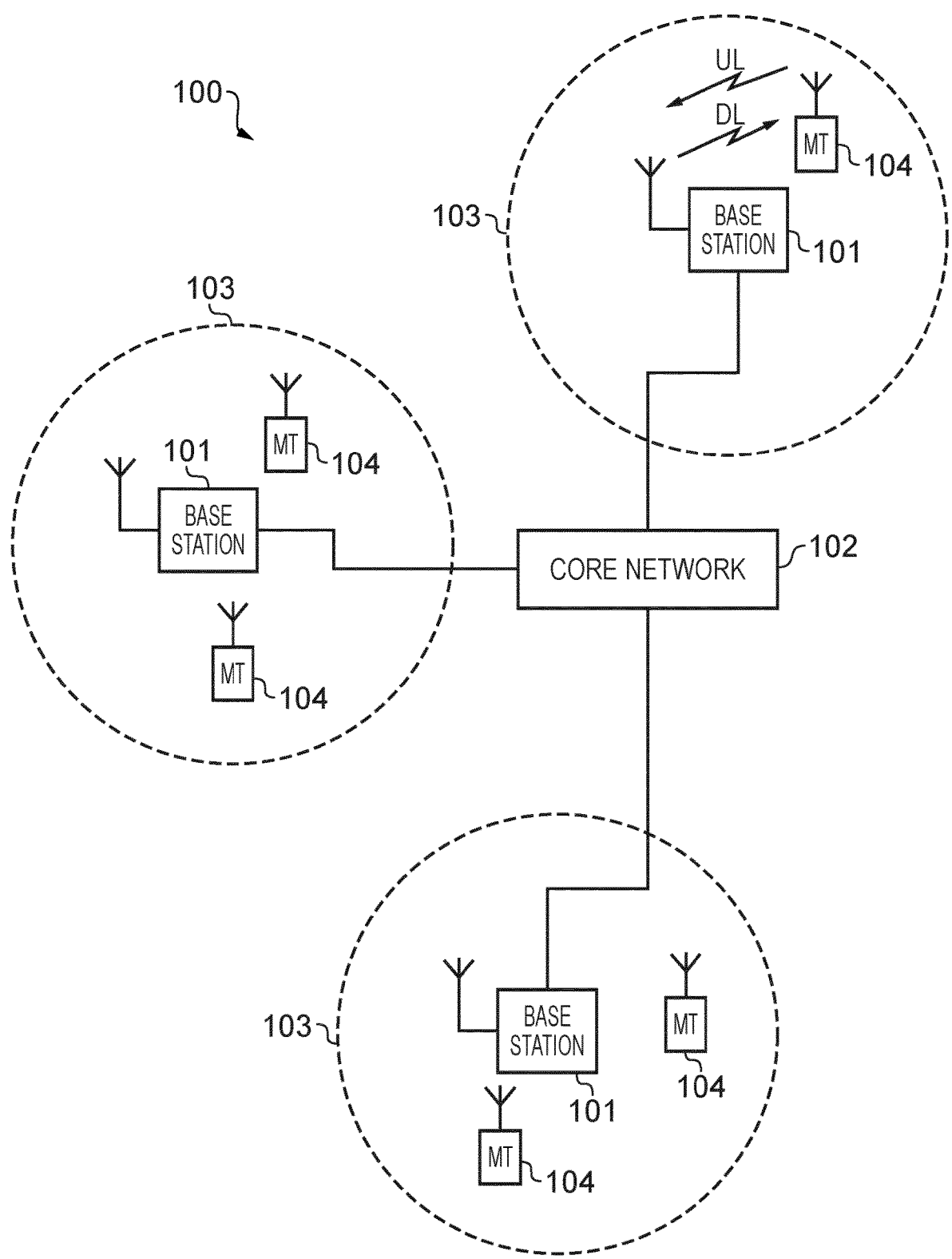
FIG. 1 schematically represents some aspects of an example LTE-type wireless telecommunication network.

FIG. 1 provides a schematic diagram illustrating some basic functionality of a mobile telecommunications network/system 100 operating generally in accordance with LTE principles, but which may also support other radio access technologies, and which may be adapted to implement examples of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [9]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain examples of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.
New Radio Access Technology (5G)

Figure 2:
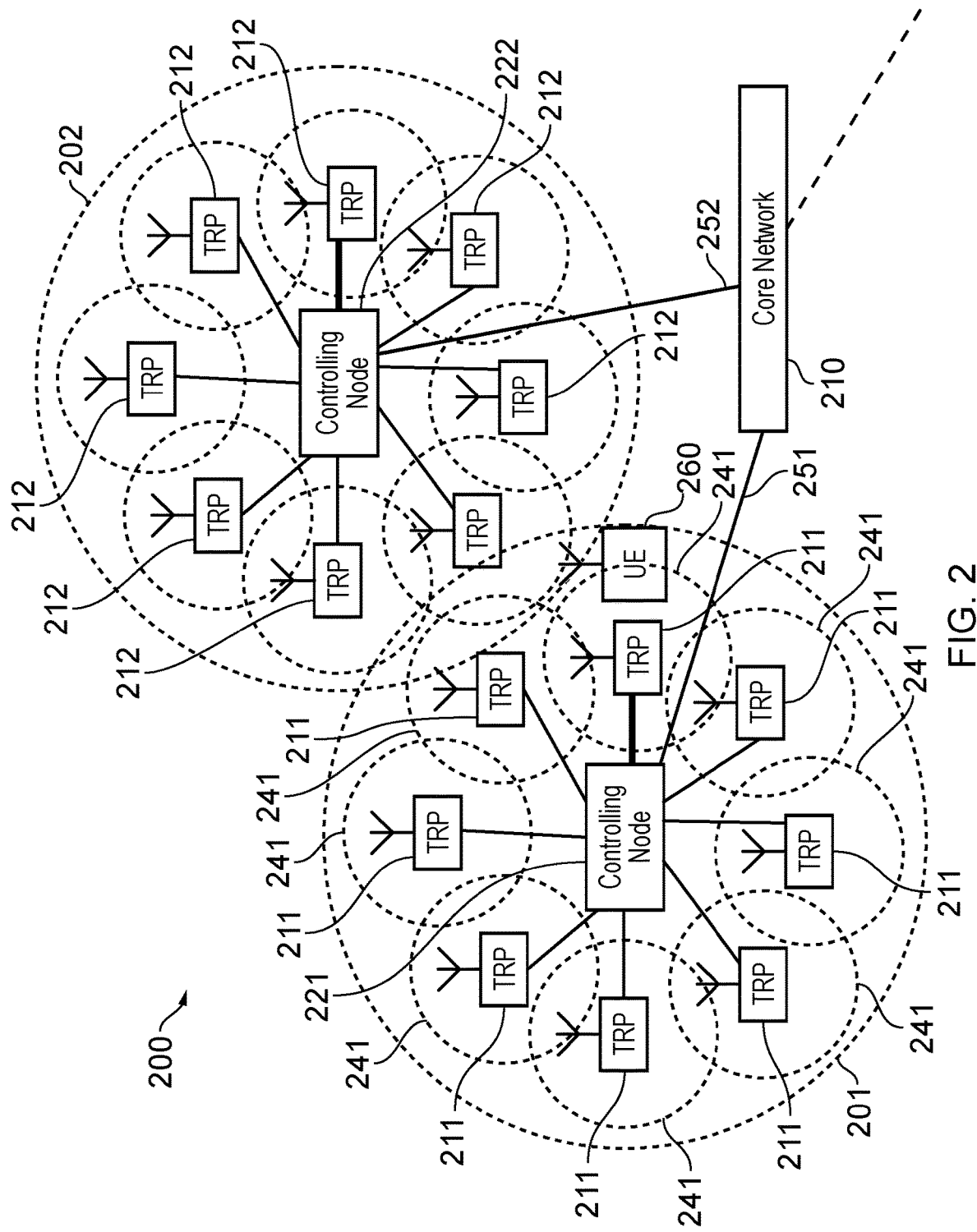
FIG. 2 schematically represents some aspects of an example new radio (NR) access technology (RAT) wireless telecommunications network.

FIG. 2 is a schematic diagram illustrating a network architecture for a new RAT wireless communications network/system 200 based on previously proposed approaches which may also be adapted to provide functionality in accordance with examples of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus examples of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, examples of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
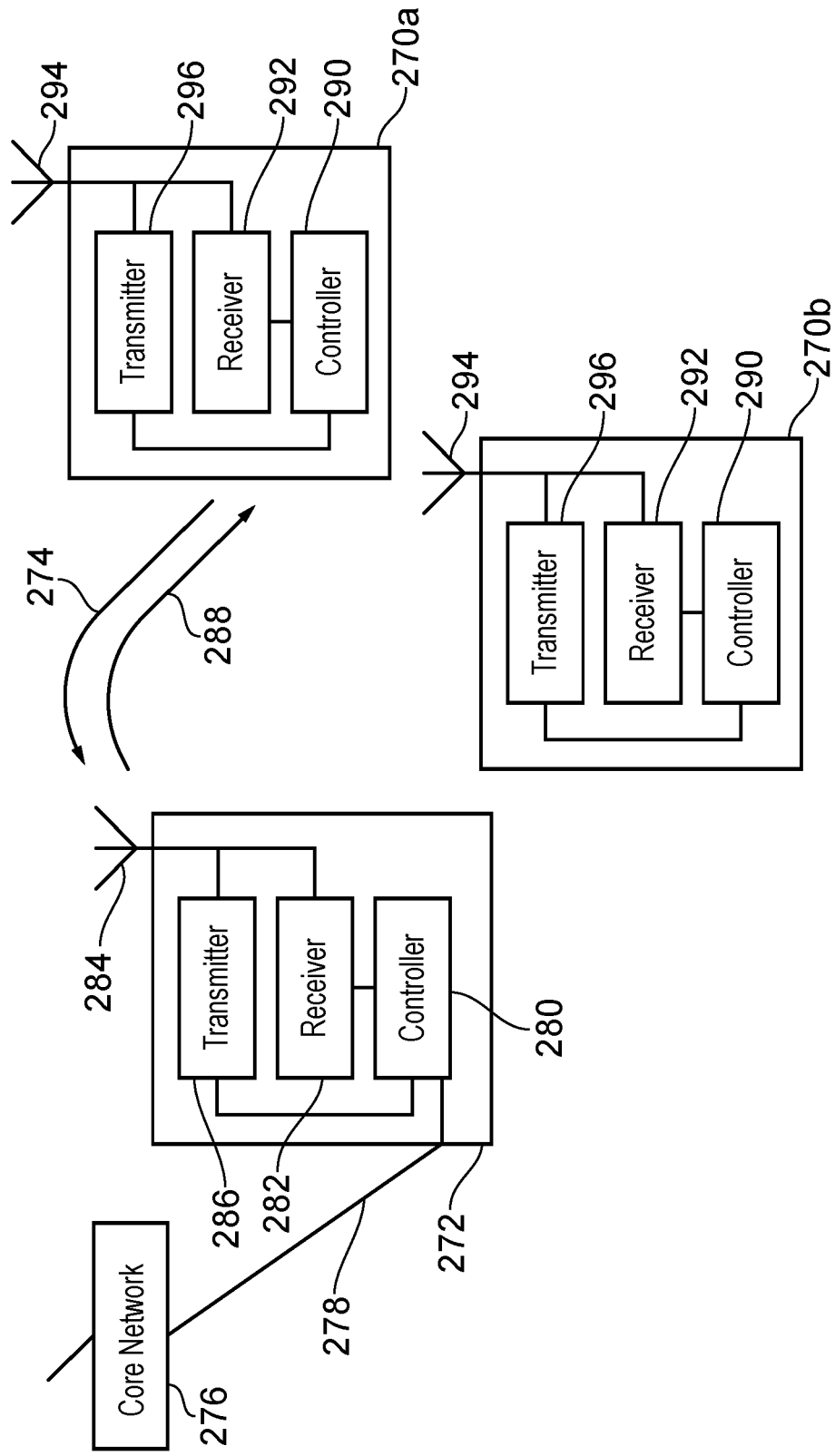
FIG. 3 schematically represents an example telecommunications system.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to receive downlink data from the infrastructure equipment 272 via resources of a wireless access interface as illustrated generally by an arrow 288 and to transmit uplink data to the infrastructure equipment 272 via resources of a wireless access interface as illustrated generally by an arrow 274. The UE 270 receives the downlink data transmitted by the infrastructure equipment 272 (or sends the uplink data to the infrastructure equipment 272) via communications resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Example Services

As mentioned above, there are a variety of services which may be supported by wireless communications networks. Development of physical layer, radio access and media access protocols and techniques can be adapted to support such services. Example services which are being defined for 5G/New Radio (NR) are the Ultra-Reliable and Low Latency Communications (URLLC) and the enhanced Mobile BroadBand (eMBB) services. URLLC has very low latency and high reliability where a URLLC data packet (e.g. 32 bytes) is required to be transmitted from the radio protocol layer ingress point to the radio protocol layer egress point of the radio interface within 1 ms with a reliability of 99.999% [5] to 99.9999%. On the other hand, eMBB requires high data rate of for example 20 Gbps with moderate latency and reliability (e.g. 99% to 99.9%).

Example developments for 3GPP are eURLLC [6] and NR Unlicensed (NR-U) [8]. For the example of eURLLC, proposals have been made to specify features for high reliability and low latency services such as factory automation, transport industry, electrical power distribution, etc. in a 5G system. Unlicensed radio frequency resources refer to a concept in which the radio resources are not exclusively allocated to a particular operator or radio communications system but are shared between systems, which to some extent compete for these resources. A 3GPP Release-16 NR-U work item specifies features for operation in unlicensed spectrum which includes incorporating Listen Before Talk (LBT) in the NR frame structure to enable NR operation in unlicensed bands.

Further developments of eURLLC have been proposed for 3GPP Release-17 in a work item [7] where one of the objectives is to incorporate characteristics associated with communicating via unlicensed radio resources, which thereby enable eURLLC operation in an unlicensed band.

Channel Access in an Unlicensed Band

In the following paragraphs, an explanation is provided of current proposals for accessing communications resources from an unlicensed frequency band. In an unlicensed band, two or more systems may operate to communicate using the same communications resources. As a result, transmissions from different systems can interfere with each other especially when for example, each of the different systems are configured according to different technical standards, for example Wi-Fi and 5G. Additionally, two or more systems using the same technology can also interfere: for example two NR-U systems can interfere with each other. While NR-U systems provided by the same operator or managed by a common entity might in some cases be configured so as to reduce an amount of interference, systems using the same technology or standards and managed by another operator or entity are more likely to cause interference. As such, there is a regulatory requirement to use a Listen Before Talk (LBT) protocol for each transmitter operating in an unlicensed band to reduce interferences among different systems sharing that band. In LBT, a device that wishes to transmit a packet will firstly sense the band for any energy levels above a threshold to determine if any other device is transmitting, i.e. "listen", and if there is no detected transmission, the device will then transmit its packet. Otherwise, if the device senses a transmission from another device it will back-off and try again at a later time.

Figure 4:
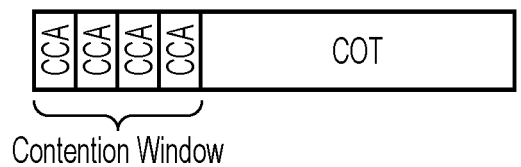
FIG. 4 schematically represents an example of a New Radio Unlicensed (NR-U) Channel Access on a grid of radio communications resources.

In NR-U, the channel access can be Dynamic (also known as Load Based Equipment) or Semi-Static (also known as Frame Based Equipment "FBE"), where both channel access schemes consist of one or more Clear Channel Assessment (CCA) processes in a Contention Window followed by a Channel Occupancy Time (COT) as shown FIG. 4. LBT is performed during the CCA phase by an NR-U device (e.g. gNB or UE) that wishes to perform a transmission. According to the CCA phase the NR-U device listens during one or more of the CCA attempts and if no other transmission is detected (i.e. energy level below a threshold) after the CCA phase, the NR-U device moves into the COT phase where it can transmit its packet in the COT resources. In Dynamic Channel Access (DCA) the CCA and COT phases can be different length between different systems whilst in Semistatic Channel Access, the CCA and COT phases have fixed time windows and are synchronized for all systems sharing the band.

In NR-U, a device can be an initiating device or a responding device. The initiating Device acquires the COT by performing CCA and typically it initiates a first transmission, e.g. a gNB acquires the COT and transmits an uplink grant. The responding device receives the transmission from the initiating device and responds with a transmission to the initiating device, e.g. a UE receives an uplink grant and transmits the corresponding PUSCH. As will be appreciated, a UE can also be an initiating device, for example when it is transmitting a Configured Grant PUSCH and the gNB can be a responding device.

There are two types of Dynamic Channel Access (DCA), which are referred to as Type 1 and Type 2. In a Type 1 DCA, a Counter N is generated as a random number between 0 and $CW_p$, where the Contention Window size $CW_p$ is set between $CW_{min,p}$ and $CW_{max,p}$. The duration of the COT and the values $\{CW_{min,p}, CW_{max,p}\}$ depend on the value p, which is the Channel Access Priority Class (CAPC) of the transmission, which may be determined for example by a QoS of the transmitting packet. A Type 1 DCA is performed by an initiating device and once the COT is acquired, one or more responding devices can use Type 2 DCA for their transmissions within the COT. Type 2 DCA may require a short CCA or no CCA prior to transmission if the gap between one transmission of two devices is less than 25 µs. If the gap is greater than 25 µs then the responding device needs to perform Type 1 DCA.

Figure 5:
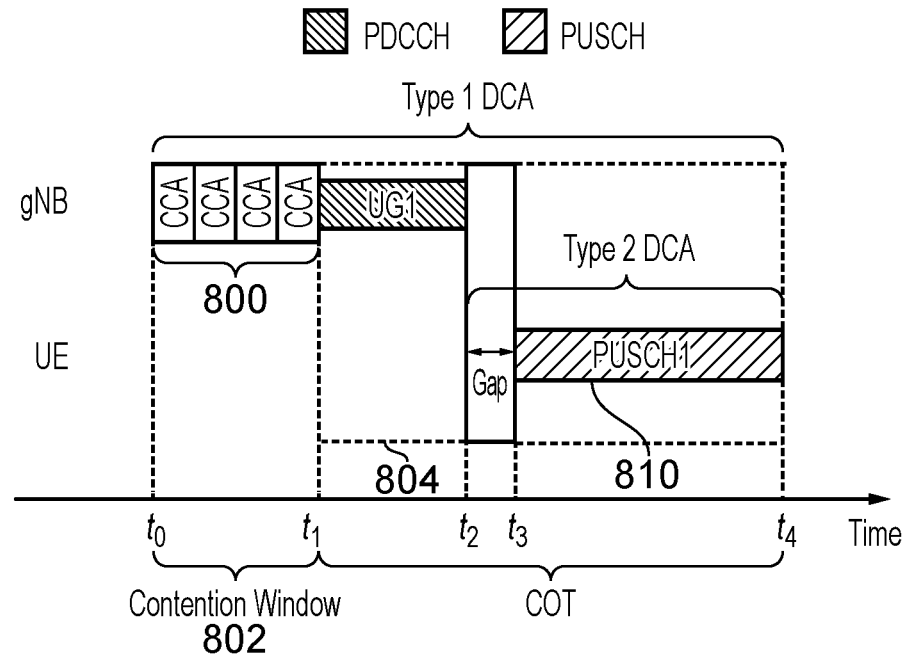
FIG. 5 schematically represents Type 1 and Type 2. Dynamic Channel Access on an uplink and downlink grid of radio communications resources.

FIG. 5 provides an illustration of frequency against time for transmission in an unlicensed band. As shown for the example of FIG. 5, an example of Type 1 DCA transmission and a Type 2 DCA is shown. According to the example shown in FIG. 5, at time t0, the gNB wishes to send an uplink grant, UG1, to the UE to schedule PUSCH1. The gNB performs a Type 1 DCA starting with a Contention Window with four CCA's 800, so that for this example the random number is N=4, and detects no energy during this Contention Window 802, thereby acquiring the COT 804 between time $t_1$ to $t_4$. The gNB then transmits UG1 to the UE scheduling a PUSCH1 at time $t_3$ as represented by arrow 810. The UE receiving the uplink grant UG1 then can use Type 2 DCA if the gap between UG1 and the start of its PUSCH1 transmission, between time $t_2$ and $t_3$ is below a threshold, otherwise the UE will have to perform a Type 1 DCA. That is to say, if the granted PUSCH1 is less than a threshold time from the gNB's transmission of the uplink grant UG1, then the UE is not required to itself contend for the resources on the unlicensed band (by transmitting in the CCA and then COT according to the Type 1 DCA).

Figure 6:
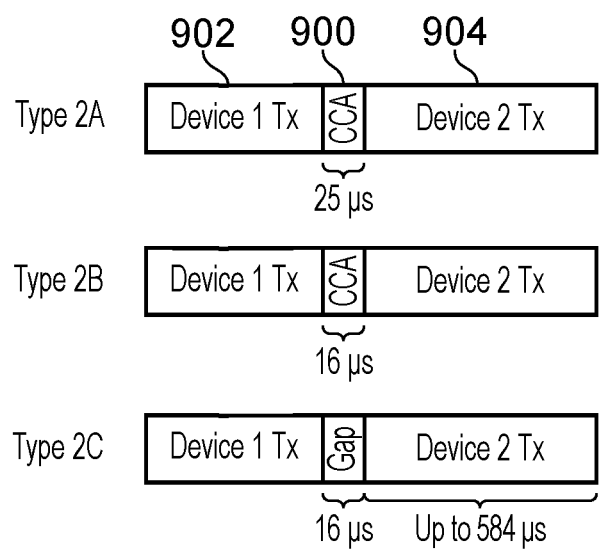
FIG. 6 schematically represents example configurations for Type 2. Dynamic Channel Access on a grid of radio communications resources.

There are three types of Type 2 DCA as shown in FIG. 6, which are defined with respect to a length of the gap 900 between transmission 902 by a first device (initiating device) and a second device 904 (responding device) within a COT and therefore whether the second responding device needs to perform a CCA:

Type 2A: The gap between two transmissions is strictly more than 16 us and not more than 25 us and the UE performs a single Clear Channel Assessment (CCA) within this gap 900. In other words, in this example, the duration of the gap $T_{gap}$ is $16 \; \mu s < T_{gap} \leq 25 \; \mu s$ Type 2B: The gap between two transmissions is not more than 16 us and the UE performs a single CCA within this gap 900 (in this example, the duration of the gap $T_{gap}$ is $T_{gap} \leq 16 \; \mu s$)

Type 2C: The gap between two transmissions is not more than 16 us and no CCA is required within this gap 900 (in this example, the duration of the gap $T_{gap}$ is $T_{gap} \leq 16 \; \mu s$)

It will be appreciated that the configuration above relates to a current pre-agreed (standardised) configuration and that other configurations may be used. In general, for Type 2 access, the values for the gap duration boundaries 16 us and 25 us could take any other appropriate minimum and maximum and the configuration may also refer to the minimum or maximum value being included (e.g. "≤" and "≥", respectively) or excluded (e.g. "<" and ">"). It should also be noted that fewer or more Access Types or Type configurations may be used while still being able to apply the teachings and techniques provided herein.

Semi-Static Channel Access (SCA)

Figure 7:
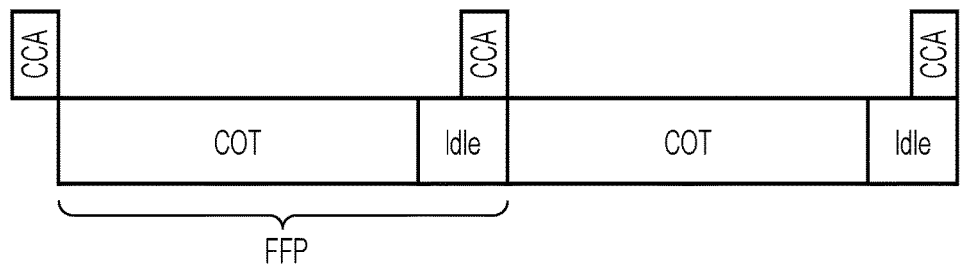
FIG. 7 schematically represents an example Fixed Frame Period.

FIG. 7 provides an illustration of an example Fixed Frame Period "FFP". In Semi-static Channel Access (SCA) a Fixed Frame Period (FFP) is defined for COT initiation. In this example, the FFP comprises a COT portion (e.g. time period) and an Idle portion (e.g. time period) where the gNB or UE do not transmit any transmissions as shown in FIG. 7.

In the present disclosure, the frame "period" is understood to refer to the time between a first instance of a frame element and the subsequent instance of the frame element. For example, it can be measured by the time before the start or the end of a frame is repeated. In a structure as illustrated in FIG. 7, it may for example be measured by the time between the start of a COT and the end of the idle portion. In cases where a gap may be provided between the COT and/or idle portions of a first frame and the COT and/or idle portion of a second frame, the period may be measured by the time between the start of a frame and the start of the subsequent frame—or the end of the frame and the end of the subsequent frame.

In a contention-based access, for example as discussed above, one or more Clear Channel Assessment (CCA) process is carried out in the idle portion. In the example of FIG. 7, the CCA (or said differently the LBT) is performed before the COT can be used and is performed during the Idle portion of the frame. While in this example the frame is defined as comprising a COT portion before an idle or LBT period, and is followed by the subsequent frame without any gap in-between, it will be appreciated that in other examples the frame could be defined as comprising an idle portion before a COT portion, an idle portion between two COT portions, two or more COT portions, two or more idle portions, a gap between a frame and the subsequent frame (wherein a gap is not used for transmitting data or for performing a LBT process) or any technically conceivable combination thereof. The teachings and techniques provided herein apply equally to these different arrangements.

Figure 8:
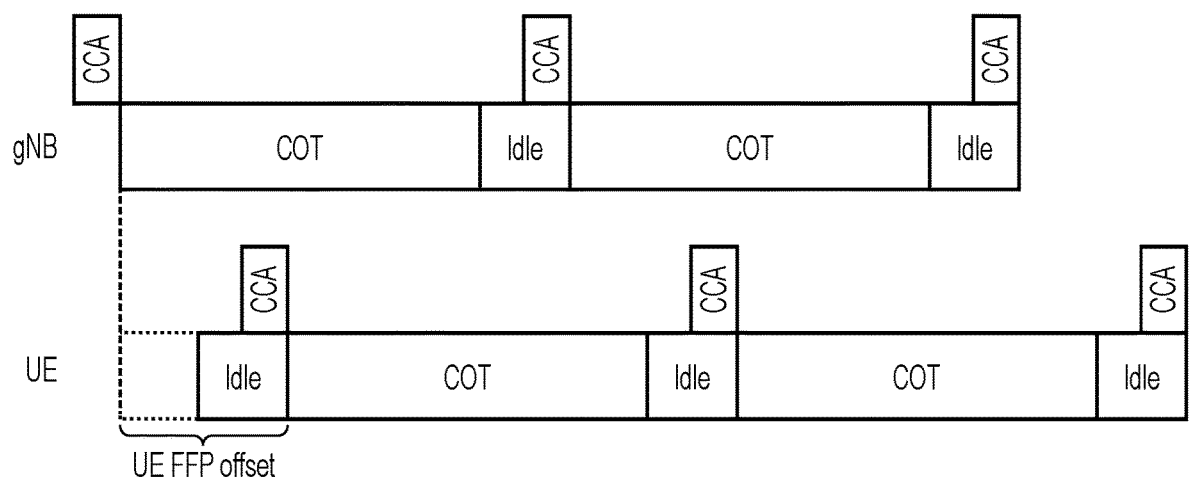
FIG. 8 schematically represents a FFP configuration for a UE and an FFP configuration for a gNB.

In Release 16 for NR-U, the gNB indicates (e.g. via signalling such as the DCI) to the UE when the UE can use the gNB-initiated COT or configures the UE (e.g. via signalling, such as RRC signalling) with the time at which it can use the gNB-initiated COT. From that perspective, as the COT is configured and/or activated by the gNB, this is referred to as a "gNB-initiated" COT. In this example implementation, the FFP parameters comprise an offset parameter and period which are configurable and broadcasted by the gNB in system information SIB1. The offset parameter configures an offset relative to the start of the radio frame with System Frame Number (SFN) zero and is illustrated in FIG. 8, as discussed below. The period parameter configures the duration of the FFP. In current systems, the FFP parameters can be reconfigured every 200 ms. In other words, the same FFP configuration is maintained by the gNB and the UE for at least 200 ms before it can be reconfigured (if appropriate).

It is expected that the Semi-static Channel Access (SCA) techniques are and will mostly be used in a controlled environment where the deployed unlicensed network is expected to experience limited interference from other unlicensed systems or devices. For example, an unlicensed network may be deployed using SCA in a factory where the use of other unlicensed systems such as Wi-Fi is not allowed. In such an environment, the FFP of each gNB in the network can be aligned and synchronized and the radio conditions can be optimised with limited considerations being given to possible interferences from third party systems or devices.

In Release 17, a UE-initiated COT has been discussed for Semi-static Channel Access (SCA) where it has been agreed that a UE can have a different FFP offset to that of the gNB. This is illustrated in FIG. 8 which shows an FFP configuration for a UE being different from an FFP configuration for the gNB. In other words, FFP of the UE and the FFP of the gNB are not aligned due to different FFP offset configurations.

Additional aspects have been considered, such as whether to allow different FFP period parameters for different UEs as well as for the gNB (see for example [10]) for Release 17 for NR-U, for example for IIOT/URLLC communications. In particular, a single FFP configuration is expected for the UE and the FFP parameters (currently period and offset) are expected to be configured via Radio Resource Control (RRC) signalling sent by the gNB. As illustrated in FIG. 8, the UE's FFP parameters can be different to the gNB's own FFP parameters. In other words, a gNB and a UE served by the gNB can have different FFP configurations.

However, the current systems and their evolutions discussed above fail to address the complexity resulting from the possibly varied devices and/or traffics which may be found in a network. In particular, the contention-based aspects may make access to the wireless resources more difficult and the prioritisation of certain UE, services and/or traffics is challenging to control or improve with current systems.

FFP Configurations

For example, it is noted that a UE can be in different modes of operations or operating modes. For example, from an RRC perspective, a UE can operate in different modes such as an IDLE Mode or CONNECTED Mode. A UE may also operate in different bandwidth parts (BWP) or sub-BWP and/or may operate to deliver different services. Accordingly, rather than using a single FFP for each UE, it is suggested that different FFPs may be used by a UE, depending on the UE's operating mode. It is noteworthy that "IDLE mode" in RRC refers to the RRC connection state of the UE and is not related with the "IDLE" periods shown in FIGS. 7-12).

Accordingly, in cases where the network (e.g. gNB) can configure a UE with two or more different FFP configurations, the efficiency of the system is expected to improve and the access to the contention-based resources is also expected to be improved. For example, if re-using the current FFP formats, each FFP of the plurality of configurations can have a different combination of period and offset.

The UE can then select a specific FFP configuration depending on its mode of operation, using for example predefined conditions such as UE operating or communication (e.g. RRC) modes, different services or different resources.

It is noted that while the examples below illustrate different example implementations, e.g. based on RRC mode, frequency or service, it will be appreciated that the teachings provided in each example may be combined with other examples. For example, there could be a system where a UE can use an FFP configuration when in RRC-IDLE, another FFP configuration when in RRC-CONNECTED in a first frequency band (where the frequency band can relate to a bandwidth part, sub-BWP or other sets or subsets of frequency resource) and two different FFP configurations in a second frequency band, depending on the type of service used or provided in the second frequency band. In other words, the present disclosure is not limited to the examples below being considered separately and they may be combined as appropriate.

Operating Mode—RRC States

In a first example, different FFP configurations may be configured and used for different modes of RRC operation. In current systems, at a given time, a UE can be in one of three RRC states, namely in IDLE Mode, INACTIVE Mode or CONNECTED Mode.

In this example, a network may configure two or more different FFP configurations based on the RRC operating mode, where one FFP configuration applies to one of the RRC connection modes (e.g. IDLE Mode) and a second FFP configuration applies to another RRC connection mode (e.g. CONNECTED Mode). In this example, the IDLE and CONNECTED Mode will be considered to illustrate the techniques disclosed herein. The skilled person will however appreciate that a separate FFP configuration may be provided for the INACTIVE Mode or that the INACTIVE Mode may use the IDLE or CONNECTED Mode FFP configurations, as appropriate. For the sake conciseness only, the remainder of this example will focus on the IDLE and CONNECTED modes.

For example, it may be useful to provide a configuration which can directly or indirectly prioritise connected UEs over idle UEs as the connected UEs are more likely to have data to send.

Offset Configuration

For example, a shorter or smaller offset may be configured for connected UEs. In such a case, it is expected that UEs in CONNECTED Mode can be configured such that their contention-based access (CCA/LBT process) is performed earlier than that of UEs in IDLE Mode (relative to the start of a reference frame, e.g. the gNB frame). This would in turn allow CONNECTED Mode UEs the opportunity to access the channel earlier compared to a UE in IDLE Mode.

While it is noted that once an IDLE UE uses a COT for its transmissions, it may mean that CONNECTED UEs might fail their CCAs, it is also expected that IDLE UEs would have small amounts of data to transmit such that the likelihood of a CONNECTED UE having a CCA attempt while the IDLE UE is using its COT for transmission is reduced (compared to a CONNECTED UE using its COT for example). Additionally or alternatively, a gap may also be configured for example for IDLE UEs so that they are not allowed to transmit or to attempt a contention-based process in the time aligned with a CONNECTED UE's contention-based window.

Presented differently, UEs in IDLE Mode in a cell can be configured not to compete fully with UEs in CONNECTED Mode for access to the radio resources or to seize the channel. This is expected to result in a higher likelihood of success for CONNECTED Mode UEs as the CONNECTED mode UEs do not have to contend with the IDLE mode UEs. Accordingly, UEs in CONNECTED Mode can sense and access the channel before UEs in IDLE mode which result in CONNECTED mode UEs having a prioritised access to the channel. The above prioritization is based in part on the expectation that when a UE is in IDLE Mode, the latency may not be as critical or important compared to when a UE is in CONNECTED Mode and already transmitting, e.g. an urgent piece of URLLC data.

Accordingly, one way of achieving different configurations for a UE, is to have the same FFP period, the same COT and idle portion durations but to use different offsets for CONNECTED and IDLE modes UEs.

Figure 9:
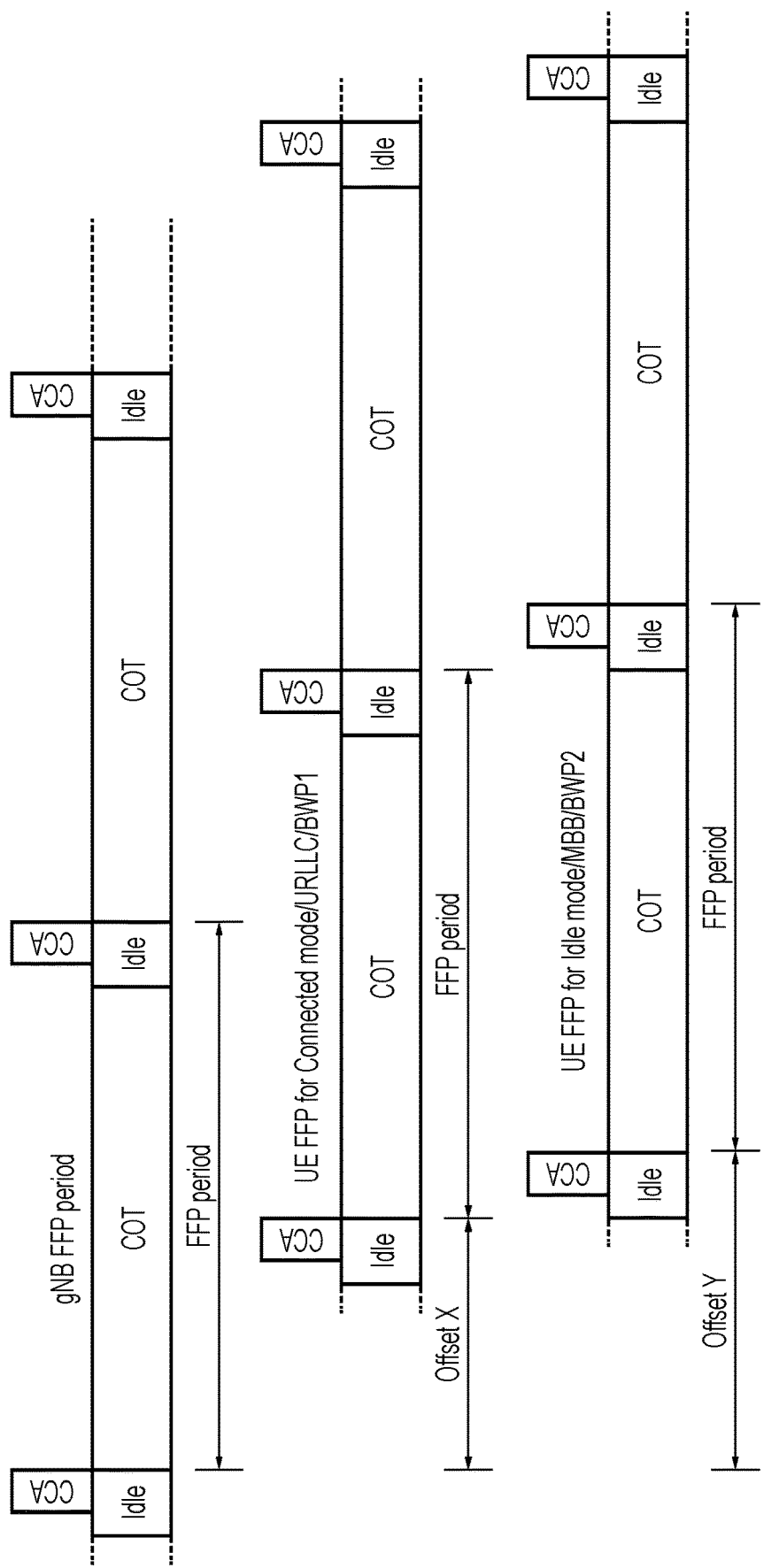
FIG. 9 schematically represents an example having different FFP configurations based on different offset parameters.

FIG. 9 schematically represents an example having different FFP configurations based on different offset parameters and illustrates an example where a UE in CONNECTED Mode is configured with a shorter offset X than the offset Y for one or more UEs in IDLE mode (i.e. offset X<=offset Y). In this example, the offsets are relative to the gNB's FFP period. In the figure, if the CONNECTED mode UE seizes the channel in the first CCA period (offset by "X"), it achieves prioritised access relative to the IDLE mode UE. If the CONNECTED mode UE does not have data to transmit at the time of the first CCA, the IDLE mode UE can seize the channel during its first CCA period (offset by "Y"). It is expected that in many cases, the transmission in IDLE mode will be relatively short. For example, when an initial access procedure is initiated, the IDLE mode UE will have finished using its COT, and hence it will have stopped transmitting, before the CONNECTED mode UE's second CCA period begins (after the offset X and a frame period). If the CONNECTED mode UE has data to transmit, it will then perform CCA during this second CCA period while the channel is unoccupied by the IDLE mode UE and before the IDLE mode UE can attempt to seize the channel a second time. Hence it is apparent that the CONNECTED mode UE has priority access to the channel compared to a UE in IDLE mode. In current systems, the gNodeB is able to configure the length of the IDLE mode UE's transmissions in IDLE mode, for example by configuring PRACH formats or the format of a PUSCH used in Message 3 of an initial access procedure. Accordingly and in some cases, the gNB can configure the frame configurations (and optionally further system configurations, such as the PRACH and/or Msg3 format in the RACH procedure) to prioritise access for CONNECTED mode UEs by setting appropriate offsets X and Y based on one or more configurations of IDLE mode transmissions.

As will be discussed below and as illustrated in FIG. 9, different offset parameters may also be configured for the configurations associated with different RRC modes, services and/or frequency bands.

Frame Period Configuration

Alternatively or additionally, different configurations can be achieved by having different FFP periods for CONNECTED and IDLE mode UEs (or more generally for other different operating modes). In addition to the latency assumption mentioned earlier, other considerations can be taken into account for determining the FFP parameters. For example, in one aspect, if a UE can initiate or obtain a COT in IDLE Mode to access the network (e.g. for a RACH or network access procedure) and if the UE has the same FFP parameters (e.g. period and offset) as CONNECTED Mode UEs, then the IDLE-Mode UE may occupy the channel for an unnecessarily long time. It is expected that a RACH message will most likely require a shorter time for transmission compared to transmissions when in CONNECTED Mode or from the base station but the IDLE-Mode UE will have obtained the COT, thereby potentially depriving other CONNECTED Mode UEs or the gNB from using the channel.

Figure 10:
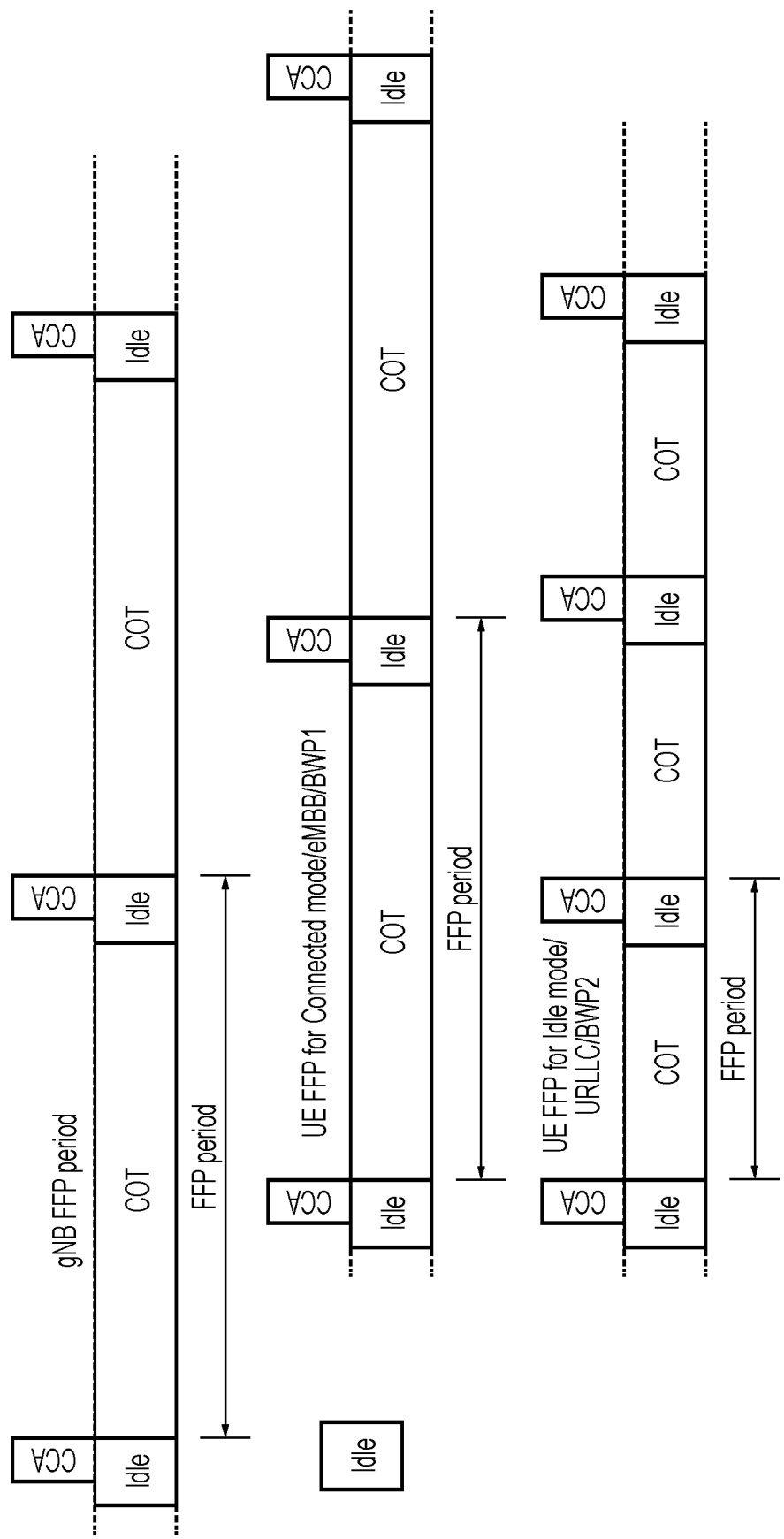
FIG. 10 schematically represents an example having different FFP configurations based on different period parameters.

FIG. 10 schematically represents an example having different FFP configurations based on different period parameters. FIG. 10 shows a UE configured with different FFP periods in CONNECTED Mode and IDLE Mode, with a view to addressing the concerns mentioned above regarding the use of resources. In this example, when a UE is in CONNECTED Mode it has a longer FFP period than in IDLE Mode. For the longer FFP period, when the UE accesses the channel it can have more time to transmit data.

However, when the UE in IDLE Mode it has a shorter FFP period that would cause it to have less time for transmission when it seizes the channel. Accordingly, if the UE can access the COT in IDLE mode, it will not use the COT for the same period than if it accesses it in CONNECTED Mode. Another benefit is that the IDLE Mode UE may have more opportunities to gain access to a COT in a given time period compared to a CONNECTED UE, so long as a CONNECTED UE is not currently transmitting. Accordingly, the IDLE UEs can access the channel at an earlier opportunity without reducing the ability of CONNECTED UEs to use the channel. Additionally, once the IDLE UE has sent its transmission in its second frame (still within the first frame of CONNECTED UEs), it will not compete to access the channel when the second frame of the CONNECTED UEs start. It will be appreciated that this trade-off, where the UE will have more LBT time opportunities but fewer resources available to transmit are particularly well suited to the respective use of resources by UEs in CONNECTED and IDLE Modes.

It is expected that in many cases the period or duration of the frames (including the COT and idle portions) for longer frames will be multiples of the shorter frames. In the example of FIG. 10, the IDLE-Mode frames are half the size of the CONNECTED Mode frames but it will be appreciated that the CONNECTED Mode frames may be three times or more generally n (n≥2) times the size of the IDLE Mode frames. Having frame periods being a multiple of other frame periods enables some the idle portions and some of the start of the COT portions of the two modes to align periodically. This is expected to minimise the effect on legacy systems by having at least some of the idle portions being aligned thereby mimicking the legacy behaviour to a greater extent compared to having longer frames which have a period which is not based on a multiple of the period of shorter frames. In other words, in an arrangement where some alignment between the UEs' frames is desirable, using this multiple relationship between the frames periods can be beneficial.

Accordingly, and additionally or alternatively to having different offset parameters for UEs in RRC IDLE or CONNECTED state or mode, such UEs may also operate using different frame periods. It is also noted that, as for FIG. 9 and as illustrated in FIG. 10, different period parameters may be configured for the configurations associated with different RRC modes, services and/or frequency bands.

Gap Configuration

In another example, different frame configurations may be used depending on a UE operating mode, where the configuration differs in a gap parameter associated with the frame.

Figure 11:
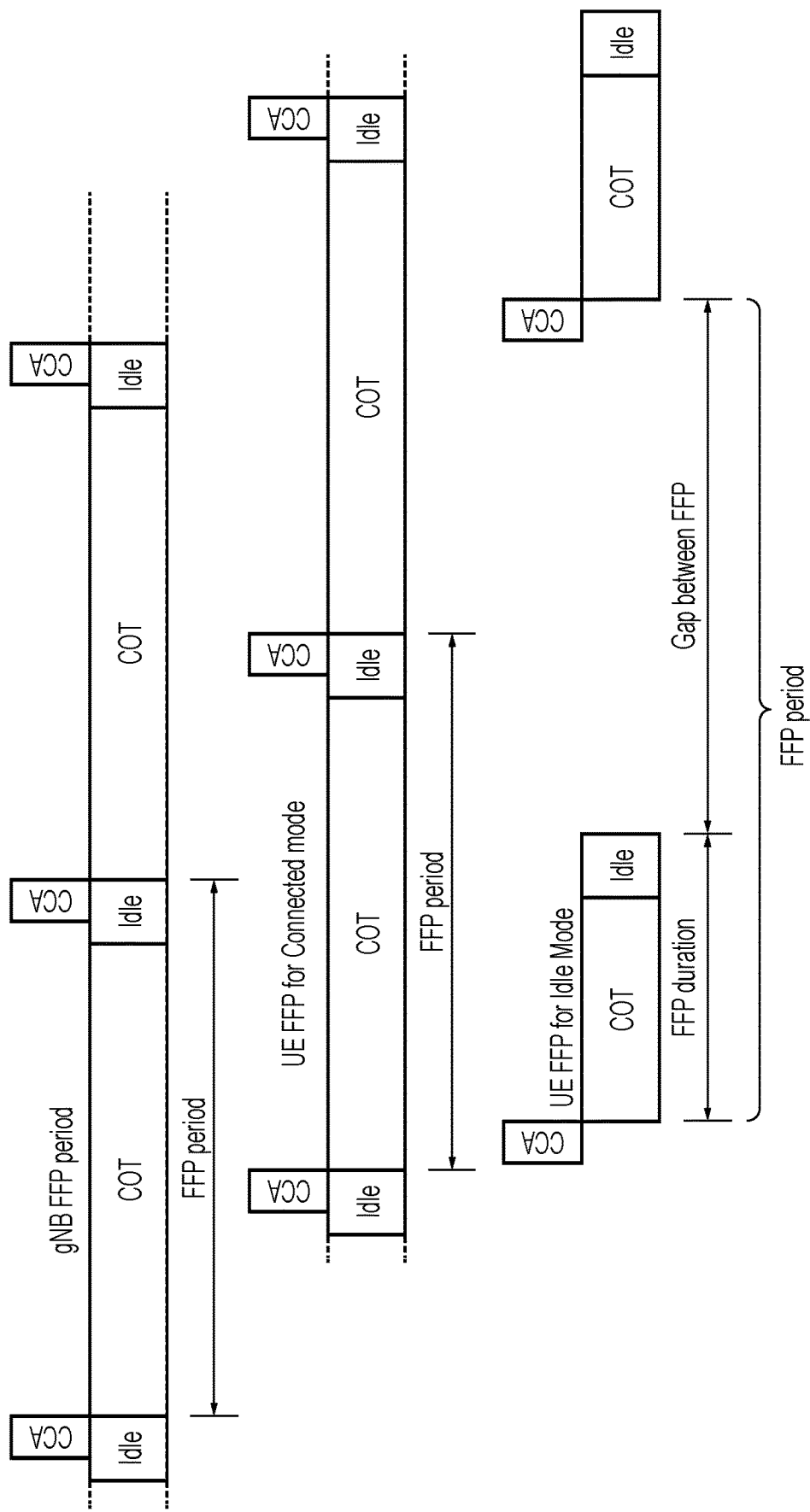
FIG. 11 schematically represents an example having different FFP configurations based on different gap parameters.

FIG. 11 schematically represents an example having different FFP configurations based on different gap parameters. In this example, there can be gaps between two frames of different sizes depending on the operating mode of the UEs. More specifically, in this particular illustrative example, gaps are provided between frames for UEs in RRC IDLE mode while the gap is not configured, implicitly configured to zero or explicitly configured to zero for UEs in RRC CONNECTED Mode. Accordingly, for UEs in RRC CONNECTED Mode or state, the frame duration corresponds or is identical to the frame period while for UEs in RRC IDLE Mode or state, the frame duration is strictly less than the frame period, due to the presence of a gap between two subsequent frames.

When considering RRC states, by configuring an IDLE Mode UE with a (relatively) shorter FFP duration and a (relatively) larger period compared to CONNECTED Mode UEs, the IDLE UEs are less likely to prevent access to the resources by another UE while they still have a periodical opportunity to transmit, e.g. to perform an access procedure such as a RACH procedure.

In the example of FIG. 11, the periods for the IDLE and CONNECTED UEs are configured as different but in other examples, they may be identical or a multiple of the other one. Having identical or multiple-based periods can be beneficial as discussed in respect of FIG. 10 above.

With a configuration where an IDLE UE is configured with on average a longer gap and/or a smaller COT size for IDLE UEs relative to CONNECTED UEs, UEs in IDLE Mode will only be able to access the channel when CONNECTED mode UEs are not currently occupying the channel, therefore prioritising the CONNECTED UEs over IDLE UEs. It should be noted that such a gap parameter would be a newly introduced parameter as the legacy and current frame and FFP configurations do not include a gap configuration. It will be understood that a gap configuration is intended to include any configuration which results in a gap being provided within a frame period. Said differently, that the configuration is associated with a frame period which includes a time portion which is available for neither transmissions nor LBT or LBT-like procedures.

Idle Portion Configuration

Figure 12:
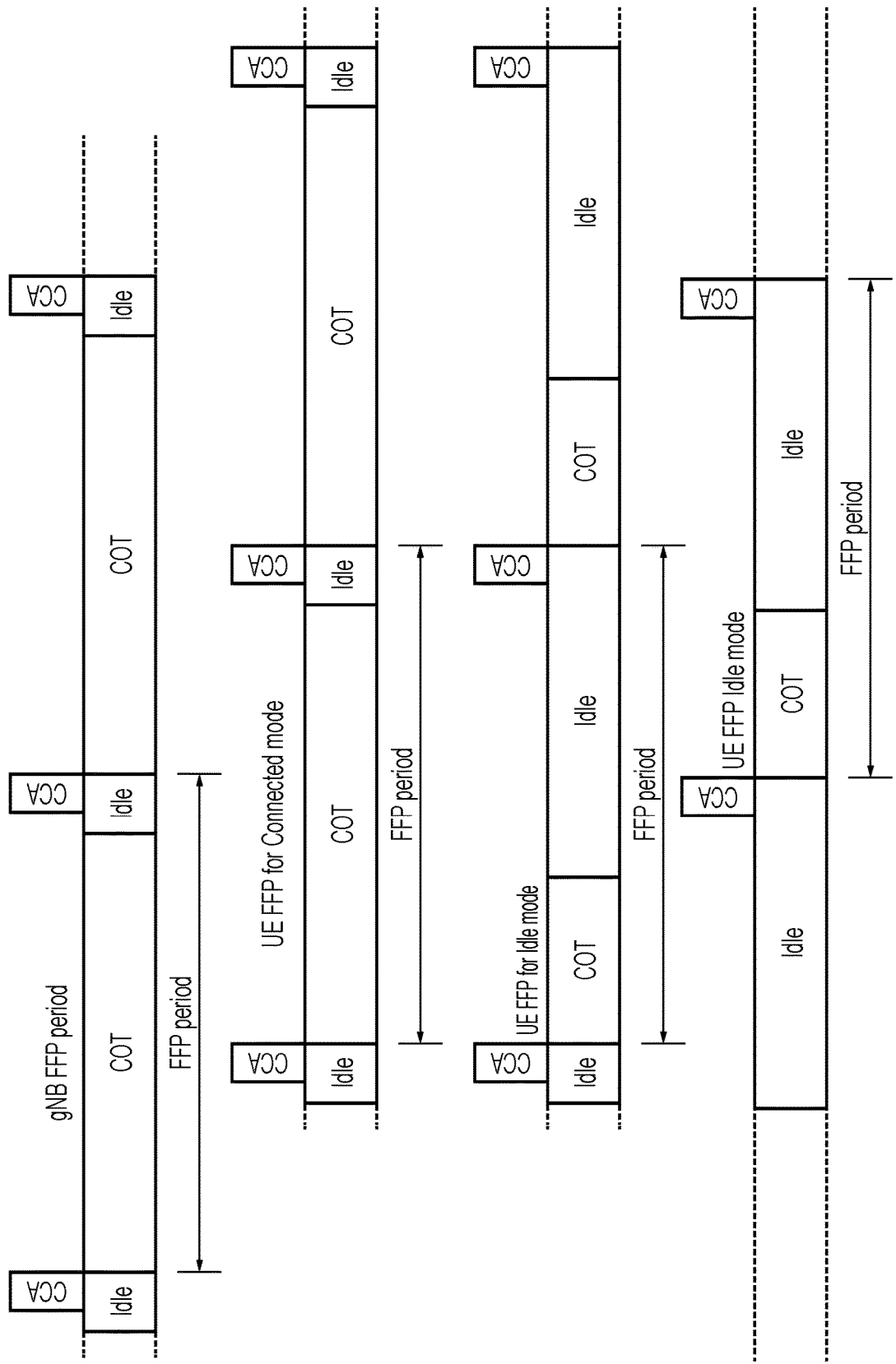
FIG. 12 schematically represents an example having different FFP configurations based on different idle portion parameters.

FIG. 12 schematically represents an example having different FFP configurations based on different idle portion parameters.

In some examples, depending on the mode of operation of the UE, the duration of the idle portion of a frame can be varied in order to better support the variety of operating modes of the UEs. This may be done by reducing the size of the COT and/or by increasing the size of the frame.

In one example, the same FFP period and different idle portions (e.g. portion sizes) are configured for CONNECTED and IDLE mode UEs. In one example, in addition to a legacy FFP period configuration, the idle portion can be configured to UEs using an idle portion or idle portion size parameter. For example, the parameter can be in a range of [minimum idle portion size, FFP period]. In some examples, the minimum idle portion size can be defined as the maximum of {100 µs; 0.05*FFP period}. More generally, the idle portion size can be defined as a function of p*FFP period, with p in a [0;1]range. As will be appreciated from the example above where the parameter is a function of the FFP period, the parameter can be solely or partly based on the FFP period, for example being defined as a size relative to the size of the frame (the frame period).

Such a configuration is expected to give UEs in IDLE mode less access or transmission time. As mentioned above, this is expected to make more of the resources available for CONNECTED UEs or gNB to use (e.g. when considering an average amount of COT or transmissions-based resources for a time unit or period). Additionally, this can contribute to a reduction in interferences between UEs as such a configuration can help avoid collisions between different UEs in IDLE mode. As illustrated in FIG. 12, two UEs have frame configurations with different offsets which can help reduce such collisions, for example when longer idle periods are configured. For example, the timing or period for the CCA or other type of contention access procedure of a first UE can correspond to an idle time of another UE (e.g. even if both UEs are in the same operating mode), thereby increasing the chances of the first UE successfully accessing a channel. These techniques and teachings can also be applied to several UEs and several groups of UEs.

While this illustrative example of configurations has been presented as a parameter of an idle portion or idle portion size, it will be understood that it may be implemented using one or more other parameters which can configure the size of the idle portion of a frame, directly or indirectly. For example, a COT size parameter variation can result in an idle size variation (e.g. depending on the size of the frame and/or on the relative size of the COT portion relative to the fame or frame period). In some cases, a parameter which can configure a proportion of one of more of a COT portion, an idle portion and a gap portion can also result in an idle portion size variation when the parameter is changed. Any suitable parameter or combination of parameters which can affect the size of the idle portion can be considered as an idle portion configuration for the frame configuration.

Accordingly, by configuring a frame, for example by configuring one or more of an offset, a frame duration (e.g. comprising a transmission window or portion and idle window or portion), a gap between frames, a transmission window (e.g. COT) duration, an idle time duration and a frame period depending on an operating mode of terminals, some terminals can be prioritised over others and network utilisation can be optimised in view of the operating mode of the terminals using the network.

As noted previously, the examples above have been provided where the operating mode of terminal is determined based on an RRC state of the terminals, e.g. RRC-IDLE (also referred to as "IDLE" herein), RRC-CONNECTED (also referred to as "CONNECTED" herein) or RRC-INACTIVE (also referred to as "INACTIVE").

It is however noted that the same frame configuration or configuration parameters can be adjusted for operating mode based on an RRC state or condition as for operating modes based on other considerations—such as the ones described below.

More generally, the same teachings can be applied to other modes of operation, either separately or in combination with an operating mode based on the RRC state of a device.

Operating Mode—Services

In one example, different frame configuration can be provided based on the service supported or used by the devices.

In legacy systems, a UE can support different services that require different qualities of service, such as eMBB and URLLC/IIoT services, as discussed above. In this case, a UE may be configured different FFPs for different services.

In this example aspect, a UE in CONNECTED Mode (or in any other RRC Mode) may be configured with multiple FFP configurations depending on the service or service type. Accordingly, such a UE can select one of these configurations for its transmissions. For example, services that require low latency can be prioritized to sense the channel to acquire a COT at the beginning of a frame period (with reference to the gNB's FFP), i.e. they may be configured with a smaller offset than for other services and/or in combination with other offset, frame duration, frame period, idle period or gap configuration for this service and for the service in order to prioritise URLLC access to the resources (potentially at the expense of a smaller COT duration. This is expected to result in a higher likelihood of success for the services with low latency, or generally for services which are configured with a smaller offset.

It will be appreciated that a different FFP period can also be configured for these services, in addition to or alternatively to using a different offset, so that the frames for transmissions associated with these services will start earlier than the other or less prioritized services. As mentioned above, the examples of FIG. 9 and FIG. 10 apply equally to operating mode being based on a communication service associated with the terminal, e.g. with the terminal and the transmission to be transmitted.

Alternatively or additionally, for URLLC or low latency and/or high reliability services, the UE can be provided with shorter FFP periods compared to a default transmission mode or to a transmission mode associated with a more delay-tolerant service. This would give the low-latency terminal (or the terminal which has a low latency transmission to send) more opportunities to access the channel, e.g. compared to eMBB services where the UE would be provided with relatively longer FFP periods. This would give eMBB terminals or services fewer opportunities to access the channel but also possibly longer transmission durations once it has acquired the COT, which is well suited to the relatively bigger packet sizes which are associated with eMBB.

In many cases, the resources for URLLC are expected to be pre-configured and known in advance by both the UE and the network (e.g. gNB), for example using configured grant (CG) resources. Accordingly, the gNB may know when a UE is expected to use a frame configuration associated with URLLC service or a non-URLLC and/or a eMBB service. In some examples, the UE can sense the channel (via listen before talk or any other appropriate contention-based access procedure) and acquire a transmission window or COT based on a frame configuration (including for example a frame period) intended for URLLC service if there is URLLC data available for transmission on the configured URLLC resources. Otherwise, the UE may sense the channel and acquire a COT based on a frame configuration intended for other services and/or for the services that the transmission relates to.

Operating Mode—Bands

In some cases, different frame configurations may be provided for different bandwidths, such as different bandwidth parts (BWP) or sub-BWPs. Said differently, the frame configuration used by the terminal may be based on the bandwidth or bandwidths for the transmission to be sent in the frame.

When considering an NR system, currently one or more BWPs are supported in NR. Additionally, NR-U communications support one or more sub-BWPs. A UE can perform an LBT procedure in each sub-BWP at different times or the same time.

With a view to giving a UE more or fewer opportunities to access the channel relative to other UEs, different sub-BWPs can be configured with different frame parameters (e.g. period and offset and/or any other parameter discussed herein) as illustrated and discussed in FIG. 9 and FIG. 10 and in their discussion above. The frame configuration can thus be based on the BWP and/or sub-BWP for the transmission In addition to the benefit of obtaining a better control of the UEs' opportunity to access the channel depending on the bandwidth (e.g. BWP, sub-BWPs, . . . ), different sub-BWPs can also in some cases support different services. For example, a service may be provided on one sub-BWP and the access to the channel for a service can be controlled and/or prioritized relative to another service by providing and using different frame parameters for different sub-BWPs. Accordingly, a service on one sub-BWP can be prioritised and can be allowed to sense (e.g. use any suitable contention-based access) and access the channel before other sub-BWPs and/or services.

Likewise, the same techniques may be used for BWPs and different parameters may be provided for different bandwidths such as different BWPs and/or different sub-BWPs.

Accordingly, a terminal may be able to use a first frame configuration when using a first bandwidth and using a second and different frame configuration when using a second bandwidth. The respective configurations can thus help achieve a better control and prioritising of the transmissions on the respective bandwidth and of the terminals using the respective bandwidths.

FURTHER CONSIDERATIONS

In some examples, an arrangement may be configured to have different configurations by having one or more set of parameters for each of the IDLE and CONNECTED modes. For example, a terminal may be configured with a set of one or more {FFP period or frame period parameter, frame duration parameter, offset parameter}. It should be noted that in some cases, the terminals may be configured with a set of values for a set of parameters {frame period; gap duration; offset} which can provide substantially the same frame format or configuration as values for a different {FFP period or frame period parameter, frame duration parameter, offset parameter} parameter set (as the gap duration is a function of the frame period and of the frame duration). In other words, there may be different types of sets of parameters which can be given values resulting in the same (or equivalent) frame configuration. Such sets of parameters (and possibly others) are considered as being equivalent configurations.

And as previously noted, the UE may also have a configuration for the INACTIVE Mode, which may be the same or different as the configurations for the IDLE or CONNECTED modes.

It is expected that in most cases, the network will determine which configurations are appropriate for the RRC states (also referred to as "Mode" herein), services, bandwidths and/or any other characteristic of the operating mode of the terminal. In such cases, the network (e.g. the base station or gNB) is expected to communicate the relevant configuration or configuration information for the UE to be able to determine which configuration to use based on its operating mode.

Such configuration information may be fully or partially transmitted in broadcast information, such as system information broadcasted by the gNB. For example, at least some of the configuration information may be broadcasted as part of SIB1 in advance. This can for example be used to communicate configuration parameters for IDLE and INACTIVE Modes. Accordingly, the UE may be able to determine an IDLE or INACTIVE configuration to use in a cell before it has transitioned to the CONNECTED state with the base station.

In some examples, configuration information (e.g. a frame duration and/or period and an offset) can be a function of a UE's identity (e.g. the UE's International Mobile Subscriber Identity "IMSI") in IDLE and INACTIVE Modes.

It will be appreciated that while these configuration determination techniques are particularly useful for IDLE and INACTIVE modes, they may also be used to determine the configuration in CONNECTED mode. It will also be appreciated that these techniques may also be combined. For example, one or more techniques may be used to determine the frame configuration across all operating modes, or different techniques (or combinations thereof) may be used to determine the frame configuration for different operating modes. For example, a frame configuration can based on one technique for an operating mode (e.g. depending on an RRC state, on a service, on a bandwidth, etc.) and based on another technique for another operating mode.

In some examples, some or all of the frame configuration parameters may be configured by explicit information and/or some or the other FFP parameters may be configured by implicit information.

Examples of explicit information include the SemiStaticChannelAccessConfig information carried in SIB (which can be used to communicate the period and offset in current systems), other SIB or system information, dedicated RRC signalling, etc.

Examples of implicit information include RACH configuration (it is noted that this configuration is already available to the UE and in some examples it can be re-used to determine an FFP configuration). In a non-limiting implementation of this example, a UE may for example assume one or more of: the periodicity of RACH occasion being equal to the frame period; the length of the RACH occasion being equal to the COT duration; and resources not configured as RACH occasions being idle portions. Using this or other techniques, the frame configuration in all or some operating modes may be communicated implicitly to the terminal.

It is also noteworthy that in some cases, the base station (e.g. gNB) can communicate an identifier for a frame configuration rather than identify the specific values and/or functions for the configuration. For example, terminals may store a set of frame configurations, wherein each frame is associated with an identifier. The base station can then provide the identifier for the configuration to use for the relevant operating modes and the terminal can use the identifier to determine the set of parameters to use when it is operating according to a particular operating mode.

As mentioned above, using an unlicensed spectrum with an FBE operation, there is currently a rule for frame configuration (e.g. FFP configuration) that once the current configuration has been configured for a UE, the UE cannot change the frame configuration before a fixed period of 200 ms has expired. In other words, a configuration, once used, is persistent for at least 200 ms.

On the other hand, the gNB may not be aware when the UE has read the SIB for the IDLE Mode FFP configurations and when the UE starts using an IDLE configuration. Accordingly, it may be challenging for the gNB to apply this 200 ms rule in this case as the gNB may not know when UE the started this process and may also not be able to keep track of when the UE can change its frame configuration, e.g. when the UE transitions to CONNECTED Mode.

Therefore, if a system were to try to improve backwards compatibility with this 200 ms rule, one or more arrangements may be considered, depending on the situation:

a) In a case where the CONNECTED Mode frame configuration is provided to the UE during an RRC Connection Setup exchange, the UE can still use the IDLE Mode frame configuration in the first 200 ms upon entering CONNECTED Mode, e.g. after RRC Connection Setup. After 200 ms expires, the UE can apply the CONNECTED Mode frame configuration that was provided during the RRC Connection Setup. This will guarantee that the UE will conform to the 200 ms FFP configuration and that both the UE and gNB have corresponding expectations regarding a change of configurations.

b) The UE may need to maintain the IDLE Mode frame configuration after it transitions to CONNECTED Mode and until the 200 ms expires from when the IDLE configuration started to be used. The UE can then signal to the gNB when the 200 ms expires.

For example, if a UE reads the SIB1 for frame configurations at time $t_0$ and after $t_1=t_0+50$ ms, the UE transitions into CONNECTED Mode, the UE can then maintain the IDLE Mode frame configuration until time $t_0+200$ ms (i.e. 200 ms after the configuration was first used and 150 ms after the UE had transitioned into CONNECTED Mode). After this time, the UE can signal to the gNB that it will apply the CONNECTED Mode frame configuration and/or the UE can notify the gNB of the time when the 200 ms period will expire, e.g. during RRC Connection Setup. In a similar case but where $t_1$ is after $t_0+200$ ms, the UE may signal or notify the gNB during the RRC Connection Setup or shortly having transitioning to CONNECTED that it will start using the CONNECTED frame configuration straight away.

c) An exception to the 200 ms FFP rule may be configured or used, wherein the rule is not applicable when the RRC state or Mode changes. For example, when the RRC state changes between IDLE Mode, INACTIVE Mode and CONNECTED Mode, the 200 ms is not applied or is ignored. In other words, once there is a change in the RRC state, the frame configuration is changed accordingly, regardless of when the frame configuration was last changed. In some cases, the 200 ms may also then be applied within each Mode. For example, the frame configuration will have to remain unchanged for at least 200 ms after a change, so long as the terminal remains in the same RRC state or Mode.

Figure 13:
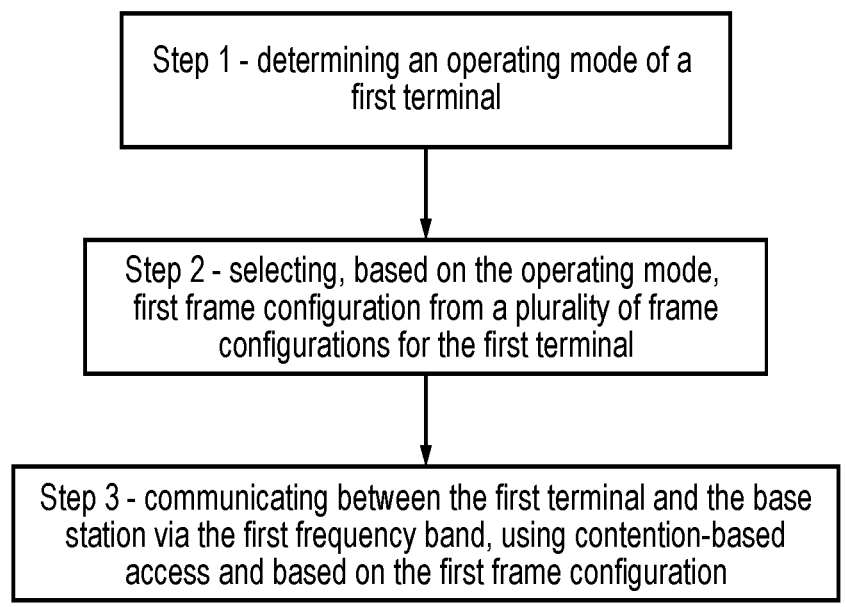
FIG. 13 schematically represents an example method for communicating between a terminal and a base station, using a contention-based access.

FIG. 13 schematically represents an example method for communicating between a terminal and a base station, using a contention-based access. It will noted that the present techniques can be applied at both the terminal and the base station such that the method of FIG. 13 may be implemented by the terminal (e.g. to determine which frame configuration to use to transmit on the uplink) or by the base station (e.g. to determine which frame configuration the terminal might have used on the uplink).

At step 1, an operating mode of a first terminal is determined. For example, the operating mode can be based on one or more of an RRC state (e.g. selected from at least one of an idle state and a connected state, optionally of an inactive state) and/or based on a communication service associated with the first terminal using the first frequency band. For example, such a communication service may comprise one or more of: a high-throughput communication service; a low latency high reliability service; a low latency service, an Ultra Reliable Low Latency Communications "URLLC" and an enhanced Mobile BroadBand "eMBB" service.

At step 2, a first frame configuration (e.g. FFP configuration) is selected, based on the operating mode and from a plurality of frame configurations for the first terminal. Each of the plurality of frame configurations configures one or more of: an offset parameter determining the start of a frame, a Channel Occupancy Time "COT" duration in a frame, an idle duration in a frame, a frame duration, a frame period and a gap duration between two subsequent frames (wherein the gap duration may be set to zero in some cases where the parameter is indeed provided and used).

As step 3, the first terminal and the base station can communicate via the first frequency band, using contention-based access and based on the first frame configuration. In particular, the first terminal can transmit on the uplink and the base station can receive transmissions from the first terminal on the uplink using the selected frame configuration.

If the operating mode is at least partially based on an RRC state (also called Mode above), the RRC idle mode can be associated with an RRC-idle frame configuration (or more, e.g. if the operating mode is also based on other aspects) and the RRC connected mode is associated with an RRC-connected frame configuration (or more, e.g. if the operating mode is also based on other aspects). In this case, the RRC-idle frame configuration may configure one or more of: a shorter COT duration; a longer idle duration and a longer offset parameter relative to the COT duration; idle duration and offset parameter, respectively, of the RRC-connected first frame configuration.

If the operating mode is at least partially based on communication service, the first frame configuration is selected based on a communication service associated with the first terminal.

The method may also further comprise identifying that the operating mode of the first terminal has changed from the determined operating mode to a further operating mode and selecting, a further frame configuration from the plurality of frame configurations, different from the first frame configuration and based on the further operating mode. The terminal may then communicate with the base station and via the first frequency band, using the selected further frame configuration. Accordingly, when the operating mode of the terminal changes, the terminal can then use a different frame configuration to reflect the change in operating mode.

In some cases, the step of communicating using the further frame configuration may be delayed until a timer has expired, for example a timer started when the previous (and thus "first" in this case) configuration was selected for use.

In some cases, selecting the frame configuration based on the operating mode comprises selecting the frame configuration based on the first frequency band. In other words, the frequency band is an aspect of the operating mode of the first terminal.

In some cases, the first terminal can select a second frame configuration from the plurality of frame configurations based on an operating mode in a second frequency band (which is also using contention-based access). The second frame configuration can for example be different from the first frame configuration. The first terminal can then communicate with the base station and via the first and second frequency bands and using the first frame configuration for communications in the first frequency band and the selected second frame configuration for communications in the second frequency band.

In some cases, the first terminal may change for operating in the first frequency band to a second frequency band. When it is identified that the first terminal has changed its operating mode in this manner, another frame configuration is selected from the plurality of frame configurations, based on the second operating mode. The terminal can then communicate with the base station via the other frequency band, using the selected other frame configuration.

In the context of the present disclosure, an unlicensed spectrum can be seen as a spectrum where devices using wireless technologies other than the one of the wireless interface (between the mobile node and network node) or using the same wireless technologies but controlled by another operator or network, may operate in the same spectrum. In other words, an unlicensed spectrum can be seen as a spectrum over which the network does not have exclusive rights or access. Accordingly, these other devices will potentially compete for the same resources as the mobile node and network node without the network or mobile nodes being able to predict the utilisation of the unlicensed spectrum by others and thus the level of interference caused by others.

The term resources or resource can refer to any suitable set of time and frequency resources to be used to transmit signals on the wireless interface. This may be measured in some cases based on a unit of resource block, slot, frame or any other resource unit deemed appropriate.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example, transmitting a message may involve using several resource elements in an LTE or NR environment such that several signals at a lower layer correspond to a single message at a higher layer. Also, transmissions from one node to another may relate to the transmission of any one or more of user data, system information, control signalling and any other type of information to be transmitted.

Also, whenever an aspect is disclosed in respect of an apparatus or system, the teachings are also disclosed for the corresponding method and for the corresponding computer program. Likewise, whenever an aspect is disclosed in respect of a method, the teachings are also disclosed for any suitable corresponding apparatus or system as well as for the corresponding computer program. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example, any one or more of a mobile node or network node may be configured accordingly if appropriate, so long as it is technically feasible and not explicitly excluded.

Whenever the expressions "greater than" or "smaller than" or equivalent are used herein, it is intended that they disclose both alternatives "and equal to" and "and not equal to" unless one alternative is expressly excluded.

It will be appreciated that while the present disclosure has in some respects focused on implementations in a 5G or NR network as such a network is expected to provide the primary use case at present, the same teachings and principles can also be applied to other wireless telecommunications systems. Thus, even though the terminology used herein is generally the same or similar to that of the 5G (or LTE) standards, the teachings are not limited to the present versions 5G (or LTE) and could apply equally to any appropriate arrangement not based on 5G/LTE, for example any arrangement possibly compliant with any future version of an LTE, 5G or other standards—defined by the 3GPP standardisation groups or by other groups. Accordingly, the teaching provided herein using 3GPP, LTE and/or 5G/NR terminology can be equally applied to other systems with reference to the corresponding functions. For example, references to HARQ-ACK or DCI can be more generally understood as references to acknowledgements (positive or negative) or control information relating to the downlink.

It will be appreciated that the principles described herein are applicable not only to certain types of communications device, but can be applied more generally in respect of any types of communications device. For example while the techniques are expected to be particularly useful for systems using NR-U communications, the skilled person will appreciate that they can also be applied more generally, for example in respect of any type of communications device operating with a wireless link to the communication network, or for peer-to-peer transmissions (either transmissions ending at another node of the radio access network, e.g. a communication device or any other type of node in the network, or transmissions to or from the main or core network and going through a mesh network in the radio access network).

It is noteworthy that where a "predetermined" element is mentioned, it will be appreciated that this can include for example a configurable element, wherein the configuration can be done by any combination of a manual configuration by a user or administrator or a transmitted communication, for example from the network or from a service provider (e.g. a device manufacturer, an OS provider, etc.).

Techniques discussed herein can be implemented using a computer program product, comprising for example computer-readable instructions stored on a computer readable medium which can be executed by a computer, for carrying out a method according to the present disclosure. Such a computer readable medium may be a non-transitory computer-readable storage medium with an executable program stored thereon, wherein the program instructs a microprocessor to perform said method. Additionally, or alternatively, the techniques discussed herein may be realised at least in part by a computer readable communication medium that carries or communicates code in the form of instructions or data structures and that can be accessed, read, and/or executed by a computer.

In other words, any suitable computer readable medium may be used, which comprises instructions and which can for example be a transitory medium, such as a communication medium, or a non-transitory medium, such as a storage medium. Accordingly, a computer program product may be a non-transitory computer program product.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely examples of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method for communicating in a mobile telecommunications network, the network comprising at least a base station configured to provide a wireless interface for one or more terminals to communicate with the base station, wherein the wireless interface comprises a first frequency band in which access to resources in the frequency band is a contention-based access, the method comprising: determining an operating mode of a first terminal of the one or more terminals;

selecting, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and communicating between the first terminal and the base station and via the first frequency band, using contention-based access and based on the first frame configuration.

Clause 2. The method of Clause 1 wherein selecting, based on the operating mode, the first frame configuration comprises selecting the first frame configuration based on a Radio Resource Control "RRC" state of the first terminal.

Clause 3. The method of Clause 2 wherein an RRC state is identified from at least one of an idle state and a connected state and, optionally of an inactive state; and the RRC idle mode is associated with at least an RRC-idle frame configuration and the RRC connected mode is associated with at least an RRC-connected frame configuration, the RRC-idle frame configuration configuring one or more of a shorter COT duration; a longer idle duration; a longer gap duration and a longer offset parameter relative to the COT duration; idle duration; gap duration and offset parameter, respectively, of the RRC-connected mode first frame configuration.

Clause 4. The method of Clause 2 or 3, further comprising:

starting, upon transitioning from a previous RRC state to a connected RRC state, a timer for a predetermined duration;

continuing using a current frame configuration for communications between the first terminal and the base station via the first frequency band until the timer expires; and upon expiry of the timer, using the selected first frame configuration thereby communicating between the first terminal and the base station and via the first frequency band, based on the first frame configuration.

Clause 5. The method of Clause 2 or 3, further comprising:

starting, upon transitioning to a first RRC state other than a connected RRC state, a timer for a predetermined duration;

continuing using a current frame configuration for communications between the first terminal and the base station via the first frequency band until the timer expires; and upon transitioning from the first RRC state to a connected RRC state, using the current frame configuration before expiry of the timer and using the selected first frame configuration upon expiry of the timer, thereby communicating between the first terminal and the base station and via the first frequency band, based on the first frame configuration;

wherein, in the event that the timer expires before transition from the first RRC state to a connected RRC state, the method comprises using the selected first frame configuration upon transitioning from the first RRC state to a connected RRC state.

Clause 6. The method of Clause 2 or 3, further comprising:

receiving broadcasted system information providing a current frame configuration for a current RRC state of the first terminal and using the current frame configuration;

starting, upon using the current frame configuration, a timer for a predetermined duration;

continuing using the current frame configuration for communications between the first terminal and the base station via the first frequency band until the timer expires; and upon transitioning from the current RRC state to a connected RRC state, using the current frame configuration before expiry of the timer and using the selected first frame configuration upon expiry of the timer, thereby communicating between the first terminal and the base station and via the first frequency band, based on the first frame configuration;

wherein, in the event that the timer expires before transition from the current RRC state to a connected RRC state, the method comprises using the selected first frame configuration upon transitioning from the current RRC state to a connected RRC state.

Clause 7. The method of Clause 6, wherein, upon expiry of the timer, the first terminal notifies the base station of the expiry of the timer.

Clause 8. The method of Clause 2 or 3, further comprising:

identifying a frame configuration change from the selected first frame configuration to a selected different frame configuration;

when it is determined that the frame configuration change is associated with a change to a new RRC state, using the different frame configuration upon transitioning to the new RRC state;

when it is determined that the frame configuration change is not associated with an RRC state change, starting a timer for a predetermined duration and upon expiry of the timer, using the different frame configuration, thereby communicating between the first terminal and the base station and via the first frequency band, based on the different frame configuration.

Clause 9. The method of Clause 4 to 8 wherein one or more frame configurations associated with the RRC Connected state are provided to the first terminal in an RRC connection setup procedure and wherein the first frame configuration is selected from the one or more frame configurations.

Clause 10. The method of Clause 4 to 9 wherein the predetermined duration is 200 ms.

Clause 11. The method of any preceding Clause wherein selecting, based on the operating mode, the first frame configuration comprises selecting the first frame configuration based on a communication service associated with the first terminal using for the first frequency band.

Clause 12. The method of Clause 11, wherein the communication service comprises one or more of: a high-throughput communication service; a low latency high reliability service; a low latency service, an Ultra Reliable Low Latency Communications "URLLC" and an enhanced Mobile BroadBand "eMBB" service.

Clause 13. The method of any preceding Clause wherein the idle duration identifies an idle time period where transmissions from the first terminal are prohibited and where at least a portion of the idle time period is available for the first terminal to perform a listen-before-talk procedure.

Clause 14. The method of any preceding Clause further comprising:
identifying that the operating mode of the first terminal has changed from the determined operating mode to a further operating mode;
selecting, based on the further operating mode, a further frame configuration from the plurality of frame configurations, the further frame configuration being different from the first frame configuration; and communicating between the first terminal and the base station and via the first frequency band, using contention-based access and based on the selected further frame configuration.

Clause 15. The method of any preceding Clause wherein selecting, based on the operating mode, the first frame configuration comprises selecting the first frame configuration based on the first frame configuration being associated with the first frequency band.

Clause 16. The method of any preceding Clause wherein the wireless interface comprises a second frequency band in which access to resources in the second frequency band is a contention-based access, the method further comprising:
selecting, based on the operating mode of the first terminal being associated with the second frequency band, a second frame configuration from the plurality of frame configurations; and
communicating between the first terminal and the base station and via the first and second frequency bands, using contention-based access and using the first frame configuration on the first frequency band and the selected second frame configuration on the second frequency band.

Clause 17. The method of any one of Clauses 1 to 16 further comprising:
identifying that the operating mode of the first terminal has changed to a second operating mode by changing from the first frequency band to another frequency band, wherein access to resources in the other frequency band is a contention-based access;
selecting, based on the second operating mode, another frame configuration from the plurality of frame configurations, the other frame configuration being different from the first frame configuration; and
communicating between the first terminal and the base station and via the other frequency band, using contention-based access and based on the selected other frame configuration.

Clause 18. The method of any preceding Clause, wherein the contention based access is a frame based contention access.

Clause 19. The method of any preceding Clause, wherein the method is implemented by the first terminal device and wherein communicating between the first terminal and the base station comprises the first terminal sending transmissions to the base station via the first frequency band, using contention-based access and based on the first frame configuration.

Clause 20. The method of any one of Clauses 1 to 18, wherein the method is implemented by the base station and wherein communicating between the first terminal and the base station comprises the base station receiving transmissions from the first terminal via the first frequency band based on the first frame configuration.

Clause 21. The method of Clause 20 comprising the base station:
determining the plurality of frame configurations for at least the first terminal;
communicating configuration information identifying the plurality of frame configurations to the first terminal.

Clause 22. The method of Clause 21 comprising communicating the configuration information using one or more of:
signalling identifying one or more of the plurality of frame configurations;
signalling comprising at least one of a parameter and a function for at least one of the plurality of frame configurations;

Clause 23. The method of Clause 22 wherein the signalling is carried over one or more of: RRC signalling, broadcasted information, system information and System Information Block Type-1 "SIB1".

Clause 24. A terminal for use in in a mobile telecommunications network, the network comprising at least a base station configured to provide a wireless interface for one or more terminals to communicate with the base station, the one or more terminals comprising the terminal wherein the wireless interface comprises a first frequency band in which access to resources in the frequency band is a contention-based access, the terminal being configured to:
determine an operating mode of the terminal;
select, based on the operating mode, a first frame configuration from a plurality of frame configurations for the terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and
send transmissions to the base station via the first frequency band, using contention-based access and based on the first frame configuration.

Clause 25. A terminal for use in in a mobile telecommunications network, the network comprising at least a base station configured to provide a wireless interface for one or more terminals to communicate with the base station, the one or more terminals comprising the terminal wherein the wireless interface comprises a first frequency band in which access to resources in the frequency band is a contention-based access, the terminal being configured to implement the method of any one of Clauses 1 to 19.

Clause 26. A base station for communicating in a mobile telecommunications network, the network comprising at least the base station, the base station being configured to provide a wireless interface for one or more terminals to communicate with the base station, wherein the wireless interface comprises a first frequency band in which access to resources in the frequency band is a contention-based access, the base station being configured to:

determine an operating mode of a first terminal of the one or more terminals;

select, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and receive transmissions from the first terminal via the first frequency band, based on contention-based access and based on the first frame configuration.

Clause 27. A base station for communicating in a mobile telecommunications network, the network comprising at least the base station, the base station being configured to provide a wireless interface for one or more terminals to communicate with the base station, wherein the wireless interface comprises a first frequency band in which access to resources in the frequency band is a contention-based access, the base Station being configured to implement the method of any one of Clauses 1 to 18 and 20 to 23.

Clause 28. A mobile telecommunications system comprising a base station according to Clause 26 or 27 and a terminal according to Clause 24 or 25.

Clause 29. Circuitry for a terminal in a mobile telecommunications network, wherein the circuitry comprises a controller element and a transceiver element configured to operate together to connect to the mobile telecommunication network via a wireless interface provided by a base station, wherein the controller element and the transceiver element are further configured to operate together to determine an operating mode of the terminal;

select, based on the operating mode, a first frame configuration from a plurality of frame configurations for the terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and send transmissions to the base station via the first frequency band, using contention-based access and based on the first frame configuration.

Clause 30. Circuitry for a terminal in a mobile telecommunications network, wherein the circuitry comprises a controller element and a transceiver element configured to operate together to connect to the mobile telecommunication network via a wireless interface provided by a base station, wherein the controller element and the transceiver element are further configured to operate together to implement the method of any one of Clauses 1 to 19.

Clause 31. Circuitry for a base station in a mobile telecommunications network, wherein the circuitry comprises a controller element and a transceiver element configured to operate together to provide a wireless interface to communicate with one or more terminals, wherein the controller element and the transceiver element are further configured to operate together to determine an operating mode of a first terminal of the one or more terminals;

select, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and receive transmissions from the first terminal via the first frequency band, based on contention-based access and based on the first frame configuration.

Clause 32. Circuitry for a base station in a mobile telecommunications network, wherein the circuitry comprises a controller element and a transceiver element configured to operate together to provide a wireless interface to communicate with one or more terminals, wherein the controller element and the transceiver element are further configured to operate together to implement the method of any one of Clauses 1 to 18 and 20 to 23.

Clause 33. A computer program product comprising instructions which, when the program is executed by a computer, cause the computer to carry out the method of any one of Clauses 1 to 23.

Clause 34. Any preceding claim, wherein the mobile telecommunications network is a network according to one or more of: a 3GPP, LTE, 5G, NR or other standard.

REFERENCES

[1] 3GPP document RP-160671, "New SID Proposal: Study on New Radio Access Technology," NTT DOCOMO, RAN #71, Gothenburg, Sweden, 7 to 10 Mar. 2016

[2] 3GPP document RP-172834, "Work Item on New Radio (NR) Access Technology," NTT DOCOMO, RAN #78, Lisbon, Portugal, 18 to 21 Dec. 2017

[3] 3GPP document RP-182089, "New SID on Physical Layer Enhancements for NR Ultra-Reliable and Low Latency Communication (URLLC)," Huawei, HiSilicon, Nokia, Nokia Shanghai Bell, RAN #81, Gold Coast, Australia, 10 to 13 Sep. 2018

[4] 3GPP document RP-190654, "New WID: Physical layer enhancements for NR ultra-reliable and low latency communication (URLLC)," Huawei, HiSilicon, RAN #83, Shenzhen, China, 18 to 21 Mar. 2019

[5] TR38.913, "Study on Scenarios and Requirements for Next Generation Access Technologies (Release 14)", v14.3.0

[6] RP-190726, "Physical layer enhancements for NR ultra-reliable and low latency communication (URLLC)," Huawei, HiSilicon, RAN #83

[7] RP-193233, "Enhanced Industrial Internet of Things (IoT) and URLLC support," Nokia, Nokia Shanghai Bell, RAN #86

[8] RP-191575, "NR-based Access to Unlicensed Spectrum," Qualcomm, RAN #84

[9] Holma H. and Toskala A, "LTE for UMTS OFDMA and SC-FDMA based radio access", John Wiley and Sons, 2009

[10] R1-2007391, "Summary #5 on enhancements for unlicensed band URLLC/IIoT for R17," Moderator (Ericsson), RAN1 #102e

The invention claimed is:

1. A method for communicating in a mobile telecommunications network, the network comprising at least a base station configured to provide a wireless interface for one or more terminals to communicate with the base station, wherein the wireless interface comprises a first frequency band in which access to resources in the frequency band is a contention-based access, the method comprising:

determining an operating mode of a first terminal of the one or more terminals;

selecting, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and communicating between the first terminal and the base station and via the first frequency band, using contention-based access and based on the first frame configuration.

2. The method of claim 1 wherein selecting, based on the operating mode, the first frame configuration comprises selecting the first frame configuration based on a Radio Resource Control "RRC" state of the first terminal.

3. The method of claim 2 wherein
an RRC state is identified from at least one of an idle state and a connected state and, optionally of an inactive state; and
the RRC idle mode is associated with at least an RRC-idle frame configuration and the RRC connected mode is associated with at least an RRC-connected frame configuration, the RRC-idle frame configuration configuring one or more of a shorter COT duration; a longer idle duration; a longer gap duration and a longer offset parameter relative to the COT duration; idle duration; gap duration and offset parameter, respectively, of the RRC-connected mode first frame configuration.

4. The method of claim 2, further comprising:
starting, upon transitioning from a previous RRC state to a connected RRC state, a timer for a predetermined duration;
continuing using a current frame configuration for communications between the first terminal and the base station via the first frequency band until the timer expires; and
upon expiry of the timer, using the selected first frame configuration thereby communicating between the first terminal and the base station and via the first frequency band, based on the first frame configuration.

5. The method of claim 4 wherein one or more frame configurations associated with the RRC Connected state are provided to the first terminal in an RRC connection setup procedure and wherein the first frame configuration is selected from the one or more frame configurations.

6. The method of claim 2, further comprising:
starting, upon transitioning to a first RRC state other than a connected RRC state, a timer for a predetermined duration;
continuing using a current frame configuration for communications between the first terminal and the base station via the first frequency band until the timer expires; and
upon transitioning from the first RRC state to a connected RRC state, using the current frame configuration before expiry of the timer and using the selected first frame configuration upon expiry of the timer, thereby communicating between the first terminal and the base station and via the first frequency band, based on the first frame configuration;
wherein, in the event that the timer expires before transition from the first RRC state to a connected RRC state, the method comprises using the selected first frame configuration upon transitioning from the first RRC state to a connected RRC state.

7. The method of claim 2, further comprising:
receiving broadcasted system information providing a current frame configuration for a current RRC state of the first terminal and using the current frame configuration;
starting, upon using the current frame configuration, a timer for a predetermined duration;
continuing using the current frame configuration for communications between the first terminal and the base station via the first frequency band until the timer expires; and
upon transitioning from the current RRC state to a connected RRC state, using the current frame configuration before expiry of the timer and using the selected first frame configuration upon expiry of the timer, thereby communicating between the first terminal and the base station and via the first frequency band, based on the first frame configuration;
wherein, in the event that the timer expires before transition from the current RRC state to a connected RRC state, the method comprises using the selected first frame configuration upon transitioning from the current RRC state to a connected RRC state.

8. The method of claim 7, wherein, upon expiry of the timer, the first terminal notifies the base station of the expiry of the timer.

9. The method of claim 2, further comprising:
identifying a frame configuration change from the selected first frame configuration to a selected different frame configuration;
when it is determined that the frame configuration change is associated with a change to a new RRC state, using the different frame configuration upon transitioning to the new RRC state;
when it is determined that the frame configuration change is not associated with an RRC state change, starting a timer for a predetermined duration and upon expiry of the timer, using the different frame configuration, thereby communicating between the first terminal and the base station and via the first frequency band, based on the different frame configuration.

10. The method of claim 1 wherein selecting, based on the operating mode, the first frame configuration comprises selecting the first frame configuration based on a communication service associated with the first terminal using for the first frequency band.

11. The method of claim 1 wherein the idle duration identifies an idle time period where transmissions from the first terminal are prohibited and where at least a portion of the idle time period is available for the first terminal to perform a listen-before-talk procedure.

12. The method of claim 1 further comprising:
identifying that the operating mode of the first terminal has changed from the determined operating mode to a further operating mode;
selecting, based on the further operating mode, a further frame configuration from the plurality of frame configurations, the further frame configuration being different from the first frame configuration; and
communicating between the first terminal and the base station and via the first frequency band, using contention-based access and based on the selected further frame configuration.

13. The method of claim 1 wherein selecting, based on the operating mode, the first frame configuration comprises selecting the first frame configuration based on the first frame configuration being associated with the first frequency band.

14. The method of claim 1 wherein the wireless interface comprises a second frequency band in which access to resources in the second frequency band is a contention-based access, the method further comprising:
   selecting, based on the operating mode of the first terminal being associated with the second frequency band, a second frame configuration from the plurality of frame configurations; and
   communicating between the first terminal and the base station and via the first and second frequency bands, using contention-based access and using the first frame configuration on the first frequency band and the selected second frame configuration on the second frequency band.

15. The method of claim 1 further comprising:
   identifying that the operating mode of the first terminal has changed to a second operating mode by changing from the first frequency band to another frequency band, wherein access to resources in the other frequency band is a contention-based access;
   selecting, based on the second operating mode, another frame configuration from the plurality of frame configurations, the other frame configuration being different from the first frame configuration; and
   communicating between the first terminal and the base station and via the other frequency band, using contention-based access and based on the selected other frame configuration.

16. The method of claim 1, wherein the contention based access is a frame based contention access.

17. The method of claim 1, wherein the method is implemented by the first terminal device and wherein communicating between the first terminal and the base station comprises the first terminal sending transmissions to the base station via the first frequency band, using contention-based access and based on the first frame configuration.

18. The method of claim 1, wherein the method is implemented by the base station and wherein communicating between the first terminal and the base station comprises the base station receiving transmissions from the first terminal via the first frequency band based on the first frame configuration.

19. A terminal for use in in a mobile telecommunications network, the network comprising at least a base station configured to provide a wireless interface for one or more terminals to communicate with the base station, the one or more terminals comprising the terminal wherein the wireless interface comprises a first frequency band in which access to resources in the frequency band is a contention-based access, the terminal being configured to:
   determine an operating mode of the terminal;
   select, based on the operating mode, a first frame configuration from a plurality of frame configurations for the terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and
   send transmissions to the base station via the first frequency band, using contention-based access and based on the first frame configuration.

20. A base station for communicating in a mobile telecommunications network, the network comprising at least the base station, the base station being configured to provide a wireless interface for one or more terminals to communicate with the base station, wherein the wireless interface comprises a first frequency band in which access to resources in the frequency band is a contention-based access, the base station being configured to:
   determine an operating mode of a first terminal of the one or more terminals;
   select, based on the operating mode, a first frame configuration from a plurality of frame configurations for the first terminal, each of the plurality of frame configurations configuring one or more of: an offset parameter determining the start of a frame, a Channel Occupancy Time "COT" duration in a frame, an idle duration in a frame, a frame duration, a frame period and a gap duration between two subsequent frames; and
   receive transmissions from the first terminal via the first frequency band, based on contention-based access and based on the first frame configuration.

\* \* \* \* \*